(12) United States Patent
Togino et al.

(10) Patent No.: US 6,222,676 B1
(45) Date of Patent: Apr. 24, 2001

(54) IMAGE DISPLAY APPARATUS

(75) Inventors: Takayoshi Togino, Koganei; Tetsuhide Takeyama, Hachioji, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/420,418

(22) Filed: Oct. 19, 1999

(30) Foreign Application Priority Data

Dec. 22, 1998 (JP) .................................................. 10-364565

(51) Int. Cl.7 .................................................. G02B 27/14
(52) U.S. Cl. ..................... 359/630; 359/631; 359/637; 359/676; 359/729
(58) Field of Search ..................... 359/630, 631, 359/633, 634, 637, 676, 678, 627, 729

(56) References Cited

U.S. PATENT DOCUMENTS

| 6,008,948 | * | 12/1999 | Togino | 359/637 |
| 6,021,004 | * | 2/2000 | Sekita et al. | 359/676 |
| 6,084,715 | * | 7/2000 | Aoki et al. | 359/630 |
| 6,097,550 | * | 8/2000 | Kimura | 359/729 |
| 6,128,137 | * | 10/2000 | Togino | 359/631 |
| 6,147,808 | * | 11/2000 | Togino | 359/637 |

FOREIGN PATENT DOCUMENTS 8-292371 11/1996 (JP) .
9-222563 8/1997 (JP) .
10-68884 3/1998 (JP) .

* cited by examiner

Primary Examiner—Loha Ben
(74) Attorney, Agent, or Firm—Pillsbury Winthrop LLP

(57) ABSTRACT

The invention relates to a slimmed-down yet high-performance image display device which comprises a decentered prism capable of internal reflection and a reflection type image display device such as a reflection-type LCD or DMD and can present bright images to an observer, and provides an image display apparatus comprising a light source 5, a reflection type image display device 3, and an ocular optical system for guiding an image displayed on device 3 into an eyeball position for forming an intermediate image 4. The ocular optical system comprises a prism member 10 comprising an entrance surface 11 and two reflecting surfaces 12 and 13. In a prism, an optical path for connecting the first surface 11 with the second surface 12 intersects a reflecting optical path from the third surface 13. The ocular optical system further comprises a back-coated reflecting surface 23 between the third surface 13 and an observer's eyeball side. The first surface 11, second surface 12 and third surface 13 are located between the image display device 3 and the intermediate image 4. The second surface 12, third surface 13 and back-coated reflecting surface 23 are each formed into a rotationally asymmetric surface shape capable of imparting power to a light beam and making correction for decentration aberrations. Illumination light is incident from the third surface 13 on the image display device 3 to illuminate the same.

21 Claims, 14 Drawing Sheets

IMAGE DISPLAY APPARATUS

BACKGROUND OF THE INVENTION

The present invention relates generally to an image display apparatus, and more particularly to a head- or face-mounted image display apparatus that may be mounted on an observer's head or face for use.

In order to allow an individual to enjoy images on a large screen, image display apparatus, especially head- or face-mounted image display apparatus have now been under extensive development.

For instance, JP-A's 7-333551 and 8-234137 disclose such image display apparatus comprising an ocular optical system for guiding to the eyeball of an observer an image displayed on an image display device built up of a liquid crystal display device (hereinafter LCD for short). This ocular optical system is designed as a decentered optical system comprising three optical surfaces while a space surrounded therewith is filled with a medium having a refractive index of at least 1. A light beam is incident from the liquid crystal display device on the decentered optical system in which the incident light is reflected at a first surface, and then internally reflected at a second surface of a concave mirror. Finally, the light leaves the decentered optical system now through the first surface, so that the image displayed on the image display device can be guided to the observer's eyeball without forming any intermediate image.

In this case, the decentered optical system is made up of three optical surfaces and two internal reflections occur in the decentered optical system. Besides, there are available various embodiments of decentered optical systems comprising two optical surfaces or four or more optical surfaces, in which at least one reflection occurs, as proposed by the applicant.

The apparatus set forth in JP-A's 7-333551 and 8-234137 are designed to be used with a transmission type image display device or LCD (liquid crystal display device). However, a reflection-type LCD device, too, can be used for an image display device for face-mounted image display equipment, as typically proposed in JP-A 7-72446. An optical system for such image display equipment is shown in FIG. 18. As shown, illumination light from a lamp light source 55 is converted into parallel beams through a collimating optical element 56, and a part (s-polarized light) of the beams is reflected by a polarized beam splitter 57 to illuminate the front face of a reflection-type LCD 58. An imaged reflected and modulated by the reflection-type LCD 58 is projected through a projecting optical element 59 onto a screen 52, so that the thus projected image can be magnified and presented through an ocular optical element 53 to an observer.

In addition to the reflection-type LCD, an image display device referred to as a DMD (digital micro-device), too, is proposed for the reflection type image display device. This is constructed as shown in FIG. 19. More specifically, FIG. 19(a) is a plan view of DMD and FIG. 19(b) is a perspective view of DMD elements. As shown, there are two-dimensionally arranged micro-mirrors 60 corresponding to pixels, wherein an addressed mirror 60' is tilted with respect to a diagonal line, thereby reflecting incident light from a certain direction on the mirror 60' in a different direction with respect to a non-tilting mirror to display a two-dimensional image. Each mirror 60 is supported by a pair of supporting posts 62 positioned at diagonal corners by means of hinges 63. Voltage is applied on one of a pair of electrodes 64 provided on a substrate 61 with the mirror 60 formed thereon, so that the mirror 60 can be rotated by electrostatic power with respect to the diagonal line between the hinges 63 (IEEE Spectrum, Vol. 30, No. 11, pp. 27–31).

An advantage in using a decentered optical system as an optical system for image display equipment is that the whole equipment can be slimmed down while high optical performance (angle of view, resolving power, etc.) is maintained to present bright images to an observer. However, only a transmission-type LCD has been designed for an image display device used with the decentered optical system. For this reason, the decentered optical systems set forth in JP-A's 7-333551 and 8-234137 are all merely constructed as a telecentric optical system with an entrance pupil positioned at infinity.

For the transmission-type LCD used as an image display device, it is required to make inter-pixel black matrices less discernible by use of a low-pass filter or the like, because the black matrices are noticeable due to a low pixel numerical aperture. On the contrary, the reflection-type LCD is less sensitive to such problems because the pixel numerical aperture can be increased. However, when images are magnified and observed using a decentration-free optical system, it is required to illuminate the reflection-type LCD using an optical element such as a light beam splitter. Especially when used with head- or face-mounted image display equipment, this device is contrary to demand for size and weight reductions, and offers a dark image problem as well.

Especially when the reflection-type LCD has an angle-of-field feature of changing the contrast of displayed images depending on the direction of view, it is required to make the side of the optical system located on the image display device substantially telecentric. With a prior art optical system wherein an illumination light beam is reflected onto the image display device using a half-coated mirror (a polarized beam splitter), however, it is required to ensure an extra space where the half-coated mirror is to be positioned. This in turn gives rise to a size problem.

SUMMARY OF THE INVENTION

In view of such prior art problems as explained above, one particular object of the invention is to provide a slimmed-down yet high-performance image display apparatus which comprises a decentered prism capable of internal reflection and a reflection type image display device such as a reflection-type LCD or DMD, and can present bright images.

To accomplish the aforesaid object, the present invention provides an image display apparatus comprising an illumination light source, an image display device and an ocular optical system for guiding an image formed by said image display device to a position of an observer's eyeball, wherein:

said ocular optical system is designed to form an intermediate image for said image formed by said image display device, so that said intermediate image can be projected onto the observer's eyeball, said ocular optical system comprises at least one prism member filled therein with a medium having a refractive index of at least 1, said prism member comprising a first surface through which image-carrying light leaving said image display device enters a prism, a second surface at which a light beam incident from said first surface is reflected and a third surface at which a light beam reflected from said second surface is reflected, while an optical path for connecting said first surface with said second surface intersects a reflection optical path from said third surface, said ocular optical system further comprises at least one back-coated reflecting surface located on an optical path between said third surface and an observer's eyeball side for reflecting a light beam upon reflection at said third surface, at least said first surface, said second surface and said third surface of said prism member being positioned between said image and said intermediate image, at least one of said second surface and said third surface, and said at least one back-coated reflecting surface have each a curved surface shape capable of imparting power to a light beam, said curved surface shape being defined by a rotationally asymmetric surface shape capable of making correction for aberrations produced by decentration, said image display device is built up of a reflection type image display device for displaying an image thereon by means of reflected light, and said illumination light source is designed to cause illumination light to be incident on said reflection type image display device from said second surface or said third surface or a surface near thereto, thereby illuminating said image display device.

In one preferable embodiment of the invention, the at least one back-coated reflecting surface is made up of one prism member together with the first, second and third surfaces. In another preferable embodiment of the invention, the at least one back-coated reflecting surface is constructed of another or a second prism member separate from the prism member comprising a first surface, a second surface and a third surface.

In what follows, an account will be given of why the above arrangement is used and how it acts.

The present invention provides an image display apparatus comprising an illumination light source, an image display device and an ocular optical system for guiding an image formed by said image display device to a position of an observer's eyeball, wherein:

said ocular optical system is designed to form an intermediate image for said image formed by said image display device, so that said intermediate image can be projected onto the observer's eyeball, said ocular optical system comprises at least one prism member filled therein with a medium having a refractive index of at least 1, said prism member comprising a first surface through which image-carrying light leaving said image display device enters a prism, a second surface at which a light beam incident from said first surface is reflected and a third surface at which a light beam reflected from said second surface is reflected, while an optical path for connecting said first surface with said second surface intersects a reflection optical path from said third surface, said ocular optical system further comprises at least one back-coated reflecting surface located on an optical path between said third surface and an observer's eyeball side for reflecting a light beam upon reflection at said third surface, at least said first surface, said second surface and said third surface of said prism member being positioned between said image and said intermediate image, at least one of said second surface and said third surface, and said at least one back-coated reflecting surface have each a curved surface shape capable of imparting power to a light beam, said curved surface shape being defined by a rotationally asymmetric surface shape capable of making correction for aberrations produced by decentration, said image display device is built up of a reflection type image display device for displaying an image thereon by means of reflected light, and said illumination light source is designed to cause illumination light to be incident on said reflection type image display device from said second surface or said third surface or a surface near thereto, thereby illuminating said image display device. According to the invention, it is thus possible to achieve a slimmed-down yet high-performance image display apparatus which can present bright images, because decentration aberrations can be mutually corrected by the prism member comprising first to third surfaces and at least one back-coated reflecting surface.

A refracting optical element like a lens cannot have power without imparting curvature to its boundary surface. When light rays are refracted at the lens boundary surface, therefore, chromatic aberrations unavoidably occur due to the chromatic dispersion of the refracting optical element. Consequently, another refracting optical element is generally added for the purpose of making correction for the chromatic aberrations.

A reflection optical element such as a mirror or prism, on the other hand, is in principle free from chromatic aberrations even though power is imparted to its reflecting surface, and so can dispense with addition of another optical element which is used only for the purpose of correcting chromatic aberrations. From the standpoint of making correction for chromatic aberrations, an optical system using reflecting optical elements is smaller in the number of optical elements than that using refracting optical elements.

At the same time, the reflecting optical system using reflecting optical elements can be smaller in size than the refracting optical system because an optical path can be turned back.

A reflecting surface has to be assembled and regulated with high precision because it is more sensitive to decentration errors than a refracting surface. Among reflecting optical elements, however, a prism has fixed position relations with respect to its respective surfaces, and so can dispense with assembly precision higher than required and regulation steps more than required because the prism can be controlled by itself with respect to decentration.

Further, the prism has an entrance surface and an exit surface, both being refracting surfaces, and a reflecting surface as well, and so is higher in the degree of freedom in correction of aberrations than a mirror having a reflecting surface alone. Especially when a substantial part of the desired power is shared by the reflecting surface so that the powers of the entrance and exit surfaces, both being refracting surfaces, can be reduced, it is possible to make chromatic aberrations much smaller than those produced by a refracting optical element such as a lens while the degree of freedom in correction of aberrations is kept higher than that achieved by a mirror. Since the prism is filled therein with a transparent medium higher in the index of refraction than air, the optical path involved can be longer than can be possible with air, so that optical elements can be much reduced in thickness and size than lenses or mirrors located in the air.

An ocular optical system is required to have good image formation capabilities not only at its center but also on its periphery. Referring here to a general co-axial optical system, the sign of the height of off-axis light rays is inverted before and after a stop, and so the symmetry of an optical element with respect to the stop is destroyed, causing off-axis aberrations to become worse. It is thus a general practice that off-axis aberrations are corrected by locating a refracting surface astride a stop, thereby ensuring symmetry with respect to the stop.

In the present invention, decentration aberrations can be mutually corrected by the prism member comprising first to third surfaces and at least one back-coated reflecting surface, so that not only axial aberrations but also off-axis aberrations can be well corrected. With only one prism member or mirror located, it is impossible to make perfect correction for decentration aberrations.

For the reason as mentioned above, one prism member comprising first to third surfaces is located in cooperation with at least one back-coated reflecting surface which is positioned between the prism member and an exit pupil side, and an intermediate image is formed on an exit side of the prism member.

By use of such a basic arrangement, it is possible to achieve a compact ocular optical system which is smaller in the number of optical elements than an optical system using a refracting or rotationally symmetric relay optical element and a decentered prism, and has good performance from its center to its periphery.

As mentioned above, the prism member used herein to construct the ocular optical system comprises at least three surfaces while a space defined by three such surfaces is filled with a medium having a refractive index of at least 1. More specifically, the prism member comprises a first surface through which image-carrying light leaving the reflection type image display device enters a prism, a second surface at which a light beam incident from the first surface is reflected, and a third surface at which a light beam reflected from the second surface is reflected. In the prism, an optical path for connecting the first surface with the second surface intersects an optical path from the third surface. Two reflections in the ocular optical system of the light ray emitted from the image display device have an outstanding effect on the turning-back of the optical path, so that the thickness of the ocular optical system can be reduced as much as possible. It is thus possible to achieve a slimmed-down ocular optical system which has a large exit pupil diameter and a wide angle of view, and so can present clear-cut images to the observer. When the side portion of the prism member opposing to the image display device is constructed like this, the degree of freedom in correction of aberrations is so increased that aberrations can be reduced. The two reflecting surfaces are located in good symmetry and so are less susceptible to aberrations. This is because aberrations produced at the two reflecting surfaces cancel each other by the two reflecting surfaces. Due to the arrangement wherein the optical path crosses over itself within the prism, it is possible to make the length of the optical path longer than would be possible with a prism of the structure wherein an optical path is simply turned back, thereby reducing the size of the prism relative to the length of the optical path. It is also possible to make the object-image distance so large that the power of each reflecting surface can be relatively weakened, resulting in reduced aberrations. A more preferable feature of this embodiment is that the two reflecting surfaces have powers of opposite signs. This can make more effective mutual correction of aberrations and, hence, achieve ever-higher resolving power.

If a prism with an optical path crossing over itself therein is used for the side portion of the prism member opposing to the image display device, it is then possible to make the prism compact, because given the optical path of the same length, this two-reflection type prism can make more effective use of space than a two-reflection type prism having a Z-shaped optical path therein. With the prism having a Z-shaped optical path therein, a light ray propagates within the prism while it passes necessarily through a separate area. With the prism with an optical path crossing over itself therein, however, a light ray passes twice through the same area, so that size reductions can be achieved. If such a shaped prism member is used in cooperation with at least one back-coated reflecting surface located on the exit side of the ocular optical system, it is then possible not only to reduce as much as possible the thickness of the ocular optical system in the direction along the exit optical axis but also to reduce the size thereof in the direction vertical with respect to the exit optical axis. It is thus possible to make the overall ocular optical system compact.

For the prism portion having such a back-coated reflecting surface, it is preferable to use a prism optical element of the type wherein positive power is assigned to the reflecting surface nearest to the exit surface, because the eyeball position of the observer, i.e., the exit pupil position of the ocular optical system is located on the outside of the optical system.

As will be seen from the examples given later, it is herein preferable that the prism portion forming a part of the ocular optical system located on the image display device side and comprising first to third surfaces and the portion located on the exit pupil side and comprising at least one back-coated reflecting surface are made up of an integral prism member or, alternatively, two prism members, i.e., a prism portion (first prism member) comprising first to third surfaces and another or a second prism member comprising at least one back-coated reflecting surface located on the exit pupil side.

In the most effective layout according to the invention, illumination light is incident from the second surface or the third surface of the prism member or the surface thereof nearest to them on the reflection type image display device to illuminate the same. With this layout, it is possible to make compact an optical system for the image display apparatus inclusive of the illumination optical element.

In this case, it is possible to achieve a slimmed-down image display apparatus which can present bright images, using a reflection type image display device such as a reflection-type LCD. In addition, the image display apparatus can be made compact because when the second surface or the third surface is provided with a reflective coating, an opening for incidence of illumination light can be illuminated through the second reflecting surface or the third reflecting surface or when the second surface or the third surface is a half-coated mirror or total reflecting surface, the opening is immediately illuminated, so that the separation between the reflection type image display device and the first surface can be made shorter when compared with illumination from between the reflection type image display device and the first surface. It is here noted that a mirror may be located between the light source and the second surface or the third surface or the surface located nearest to them.

If the second surface or the third surface of the prism member is made up of a half-coated mirror surface, it is then possible to make a sensible tradeoff between guiding illumination light to the image display device such as a reflection-type LCD and guiding reflected light from the image display device such as a reflection-type LCD to the observer's eyeball, thereby making small the angle of reflection at these reflecting surfaces of reflected light from the image display device such as a reflection-type LCD, resulting in reduction of decentration aberrations.

If light from the image display device such as a reflection-type LCD is totally reflected at the second surface or the third surface with neither a mirror nor a half-coated mirror used therefor, it is then possible to make more effective use of illumination light as compared with the use of a half-coated mirror or the like, thereby forming a brighter image.

Here assume that a light ray reaching the center of the display surface of the image display device upon passing through the center of a pupil is defined as an axial chief ray, as viewed in a back ray tracing mode. Unless at least one reflecting surface of the prism member and at least one back-coated reflecting mirror according to the invention are decentered with respect to the axial chief ray, then the incident ray and reflected ray of the axial chief ray take the same optical path with the result that the axial chief ray is cut off in the optical system. This in turn causes an image to be formed by only the light beam the central portion of which is cut off, resulting in the formation of an image the center of which is dark or failing to form any image at the center portion.

As a matter of course, it is also possible to decenter the powered reflecting surface with respect to the axial chief ray.

When the powered reflecting surface is decentered with respect to the axial chief ray, it is desired that at least one surface of the surfaces forming the prism member used herein be defined by a rotationally asymmetric surface. In view of correction of aberrations, it is particularly desired that the first reflecting surface (second surface) of the prism member be defined by a rotationally asymmetric surface.

The reason will now be explained at great length.

First of all, an account is given of the coordinate system, and rotationally asymmetric surface used herein.

Here let the Z-axis be an optical axis defined by a straight line section of the axial chief ray terminating at a first surface of the optical system, the Y-axis be an axis that is perpendicular to the Z-axis and lies in a decentered plane of each of the surfaces forming a phototaking optical system, and the X-axis be an axis that is perpendicular to both the optical axis and the Y-axis. The light ray is traced in the back direction from a pupil toward an image display device.

Generally, a spherical lens system constructed of a spherical lens alone is designed such that spherical aberration produced at the spherical lens and aberrations such as coma and field curvature are mutually corrected at some surfaces, thereby reducing the aberrations throughout the system.

To make satisfactory correction for aberrations with a limited number of surfaces, on the other hand, rotationally symmetric aspheric surfaces, etc. are used. This is to reduce various aberrations produced at a spherical surface.

In a decentered optical system, however, it is impossible to make correction for rotationally asymmetric aberrations produced by decentration with a rotationally symmetric optical system. The rotationally asymmetric aberrations produced by decentration, for instance, include distortion and field curvature as well as axial astigmatism and coma.

An account is first given of rotationally asymmetric field curvature. For instance, assume that a ray from an object point at infinity is reflected at a concave mirror upon incidence thereon to form an image. Then, the back focal length of the concave mirror from its portion on which the ray is incident to an image plane is half of the radius of curvature of the portion on which the ray strikes, when there is air on the image plane side. Thereupon, the resultant image plane tilts with respect to the axial chief ray, as shown in FIG. 15. With a rotationally symmetric optical system, it is thus impossible to make correction for the rotationally symmetric field curvature.

To make correction for this tilting field curvature with a concave mirror M per se, which is a field curvature source, it is required to construct the concave mirror M of a rotationally asymmetric surface. Furthermore in this example, it is required to make curvature (refracting power) strong in the positive Y-axis direction and make curvature (refracting power) weak in the negative Y-axis direction. If a rotationally asymmetric surface having the same effect as in the aforesaid arrangement is incorporated together with the concave mirror M in the optical system, it then possible to obtain a flat image plane with the use of a reduced number of surfaces.

In view of correction of aberrations, it is preferable to use a rotationally asymmetric surface having no axis of rotational symmetry both within and without the plane, because the degree of freedom is increased.

Then, an account is given of rotationally asymmetric astigmatism.

As in the foregoing, the decentered concave mirror M also produces astigmatism with respect to the axial chief ray, as shown in FIG. 16. Correction of this astigmatism may be made by properly varying the curvature of the rotationally asymmetric surface in the X-axis and Y-axis directions, as in the foregoing.

Subsequently, an account is given of rotationally asymmetric coma.

As in the foregoing, the decentered concave mirror M also produces coma with respect to the axial chief ray, as shown in FIG. 17. Correction of this coma may be made by varying the inclination of the rotationally asymmetric surface farther off the origin of an X-axis and properly altering the inclination of the surface depending on the positive or negative direction of the Y-axis.

In the image-formation optical system according to the invention, it is also possible to impart power to at least one rotationally asymmetric surface having the aforesaid reflecting action by decentering it with respect to the axial chief ray. With this arrangement, it is possible to make correction of decentration aberrations with the reflecting surface itself, which aberrations are produced by imparting power thereto. It is thus possible to make the power of the refracting surface of a prism weak, thereby reducing the occurrence of chromatic aberrations themselves.

Preferably, the rotationally asymmetric surface used herein should be a free-form surface symmetric with respect to plane, which surface has only one symmetric plane. As used herein, the free-form surface is defined by the following equation (a). In this regard, it is noted that the axis of the free-form surface is given by the Z-axis in the defining equation:

$$Z = cr^2 / [1 + \sqrt{\{1 - (1+k)c^2 r^2\}}] + \sum_{j=2}^{66} C_j X^m Y^n. \tag{a}$$

Here the first term in equation (a) is a spherical term and the second term is a free-form surface term. In the spherical term, c is a vertex curvature, k is a cornic constant (conical constant), and $r = \sqrt{(X^2 + Y^2)}$.

The free-form surface term is given by $$\sum_{j=2}^{66} C_j X^m Y^n = C_2 X + C_3 Y + C_4 X^2 + C_5 XY +$$
$$C_6 Y^2 + C_7 X^3 + C_8 X^2 Y + C_9 XY^2 + C_{10} Y^3 +$$
$$C_{11} X^4 + C_{12} X^3 Y + C_{13} X^2 Y^2 + C_{14} XY^3 C_{15} Y^4 +$$
$$C_{16} X^5 + C_{17} X^4 Y + C_{18} X^3 Y^2 + C_{19} X^2 Y^3 +$$
$$C_{20} XY^4 + C_{21} Y^5 + C_{22} X^6 + C_{23} X^5 Y +$$
$$C_{24} X^4 Y^2 + C_{25} X^3 Y^3 + C_{26} X^2 Y^4 + C_{27} XY^5 +$$
$$C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 +$$
$$C_{35} XY^6 + C_{36} Y^7$$

where $C_j$ is a coefficient where j is an integer of 2 or greater.

Generally in the aforesaid free-form surface, both the X-Z plane and the Y-Z plane have no symmetric plane. In the present invention, however, the free-form surface is allowed to have only one symmetric plane parallel with the Y-Z plane by reducing all the odd-numbered powers with respect to X to zero. In defining equation (a), for instance, this may be achieved by reducing to zero the coefficients of terms $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, . . . .

Also, the free-form surface is allowed to have only one symmetric plane parallel with the X-Z plane by reducing all the odd-numbered powers with respect to Y to zero. In the aforesaid defining equation, for instance, this may be achieved by reducing to zero the coefficients of terms $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, . . . .

If a symmetric plane is given by either one of the directions of the aforesaid symmetric plane and, for instance, the optical system is decentered in the Y-axis direction with respect to the symmetric plane parallel with the Y-Z plane and decentered in the X-axis direction with respect to the symmetric plane parallel with the X-Z plane, it is then possible to make effective correction for rotationally asymmetric aberrations produced by decentration and, at the same time, improve productivity.

The aforesaid defining equation (a) is herein referred to as one example as already mentioned. The present invention is characterized in that by use of a rotationally asymmetric surface having only one symmetric plane, rotationally asymmetric aberrations produced by decentration are corrected simultaneously with productivity improvements. It is thus to be understood that the same is also true of any other defining equations.

To illuminate the reflection type image display device according to the invention, the second surface is made up of a half-coated mirror surface or total reflecting surface which serves not only as a surface for reflecting a image-carrying light beam from the image display device but also as a surface for incidence of an illumination light beam from the illumination light source. Through the second surface, the illumination light from the illumination light source enters and illuminates the reflection type image display device.

In this case, it is desired that the illumination light beam incident from the second surface pass through the first surface to illuminate the reflection type image display device.

In the invention, the third surface, too, may be made up of a half-coated mirror surface or total reflecting surface which serves not only as a surface for reflecting the image-carrying light beam from the image display device but also as a surface for incidence of the illumination light beam from the illumination light source.

In this case, it is desired that the illumination light beam incident from the illumination light source through the third surface pass through the first surface upon reflection at the second surface to illuminate the reflection type image display device.

Referring here to the surface shapes of the first to third surfaces, it is desired that both the second surface and the third surface be formed into a rotationally asymmetric curved surface shape capable of imparting power to the light beam and making correction for decentration aberrations.

It is also desired that the first surface be formed into a rotationally asymmetric surface shape capable of imparting power to the light beam and making correction for decentration aberrations.

When the prism portion comprising the first to third surfaces, which is a portion of the ocular optical system of the invention located on the image display device side and the portion comprising at least one back-coated reflecting surface located on the exit pupil side are made up of an integral prism member, at least one reflecting surface and at least one exit surface may be included on an optical path between the intermediate image and the observer's eyeball in addition to the back-coated reflecting surface. In this case, at least one of the reflecting and exit surfaces may be formed into a rotationally asymmetric surface shape capable of imparting power to the light beam and making correction for decentration aberrations.

In this case, the reflecting and exit surfaces may be made up of the same surface while the reflecting surface is made up a total reflecting surface.

With such a combined reflecting and exit surface type, it is possible to reduce the thickness of the prism member in the emergent ray direction, because the incident ray is reflected at that surface with a large angle of bending toward the back-coated reflecting surface, so that the ray can be bent at the back-coating reflecting surface with a reduced angle of bending.

When the prism member of such makeup is used, it is particularly preferable to impart positive power to the back-coated reflecting surface (although it is acceptable that negative power may be locally present).

In the present invention, both the combined reflecting and exit surface and the back-coated reflecting surface may be formed into a rotationally asymmetric surface shape capable of imparting power to the light beam and making correction for aberrations produced by decentration.

When the prism member in the ocular optical system is made up of a single integral prism member, two back-coated reflecting surfaces may be located between the intermediate image and the exit pupil side, as will be seen from Examples 5 and 6 given later. In this case, the light beam reflected from the third surface is reflected at the first back-coated reflecting surface, then at the combined reflecting and exit surface and then at the second back-coated reflecting surface, leaving the prism through the combined reflecting and exit surface. According to this embodiment where two back-coated reflecting surfaces and two combined reflecting and exit surfaces are located between the intermediate image and the exit pupil side or a separate optical action surface is used for the first back-coated reflecting surface, the degree of freedom in designing that surface is so increased that the amount of projection of the prism toward the side facing away from the exit pupil can be reduced, resulting in a decrease in the thickness of the prism in the direction along the exit optical axis. In addition, the presence of four optical action surfaces on the exit pupil side ensures an ever-higher degree of freedom in correction of aberrations, and so enables the aberrations to be well corrected.

In this case, the first back-coated reflecting surface may be formed into a rotationally asymmetric surface shape capable of imparting power to the light beam and making correction for aberrations produced by decentration.

When the prism portion comprising the first to third surfaces, which is a portion of the ocular optical system of the invention located on the image display device side and the portion comprising at least one back-coated reflecting surface located on the exit pupil side are made up of a first prism member and another or a second prism member, respectively, a prism member comprising at least an entrance surface, a back-coated reflecting surface, a reflecting surface and an exit surface may be used for the second prism member while at least one of the reflecting surface and the exit surface is formed into a rotationally asymmetric surface shape capable of imparting power to the light beam and making correction for aberrations.

In this case, too, the reflecting surface and exit surface of the second prism may be made up of the same surface while the reflecting surface is made up of a total reflecting surface, as in Examples 1 to 4 given later.

With such a combined reflecting and exit surface type, it is possible to reduce the thickness of the second prism member in the emergent ray direction, because the incident ray is reflected at that surface with a large angle of bending toward the back-coated reflecting surface, so that the ray can be bent at the back-coating reflecting surface with a reduced angle of bending.

When the second prism member of such makeup is used, it is particularly preferable to impart positive power to the back-coated reflecting surface (although it is acceptable that negative power may be locally present).

It is then desired that the exit surface of the first prism member be in opposition to the entrance surface of the second prism.

Throughout the aforesaid embodiments, it is desired that the rotationally asymmetric surface be formed into a free-form surface shape having only one symmetric plane.

In this case, the only one symmetric plane may be in agreement with a section where the axial chief ray is turned back.

In the present invention, the illumination light source, reflection type image display device and ocular optical system should preferably be designed such that the angle of incidence of the illumination light from the illumination light source on the reflection type image display device be substantially equal, with an allowance of ±10%, to the angle of emergence of the chief ray reflected from the reflection type image display device. Within this range, the present image display apparatus can present bright displays to the observer.

It is also desired that a numerical aperture-reducing member be located between the illumination light source and the prism member to prevent the occurrence of ghost images.

Throughout the embodiments of the invention, it is desired that the reflecting surfaces of the prism member except the total reflecting surface be made up of reflecting surfaces with aluminum, silver or other metal thin films formed thereon or with dielectric multilayer films formed thereon. When reflective metal thin films are used, it is possible to obtain high reflectance with ease. The dielectric thin films are on the other hand favorable to form reflecting films less susceptible to wavelength selectivity, and absorption.

It is thus possible to obtain a low-cost yet small-size ocular optical system less susceptible to prism fabrication precision.

In the present invention, a cover member may be provided on the side of the ocular optical system-forming prism member that faces the exit pupil between the ocular optical system and the exit pupil. In this case, the cover member is formed into a plane-parallel plate shape imparting no power to the light beam, a positive lens shape imparting a convergent action on the light beam or a negative lens shape imparting a divergent action on the light beam.

When the ocular optical system of the invention is made up of a plurality of prism members, it is to be understood that diopter may be controlled by movement of one prism. However, diopter control may also be achieved by moving the image display surface in the direction of the axial chief ray incident on the surface of the optical system located nearest to the image display device.

In the ocular optical system of the invention, it is desired to form at least one prism member an organic material such as a plastic material, because cost reductions are achievable. The use of a low-hygroscopicity material such as amorphous polyolefin is also desired because the image formation capabilities are less affected by humidity changes.

When, in the invention, the ocular optical system is made up of a plurality of prism members, it is desired to provide the optical action-free surfaces of the prism members with relative alignment members. Especially when a plurality of prism members with powers imparted to reflecting surfaces are used, relative misalignments are responsible for performance degradation. In the invention, relative alignment members are thus provided on the optical action-free surfaces of the prism member, thereby ensuring relative alignment precision and the desired performance. Especially if the alignment members are used together with connectors to integrate a plurality of prism members into a single unit, then any assembly regulation can be dispensed with, resulting in further cost reductions.

In the invention, it is also possible to construct the ocular optical system of only one prism member. This in turn leads to a reduction in the number of parts, again resulting in further cost reductions. As a matter of course, a plurality of prism member may be integrated into a single prism unit, resulting in some outstanding cost reductions.

As additional constructive elements, other (positive, and negative) lenses may be located at a plurality of positions on the exit side (sides) of one or two prism members and/or between two prism members and/or on the image display device side (sides).

As a matter of course, it is to be understood that the refracting, and reflecting surfaces of the optical system may be made up of spherical surfaces or rotationally asymmetric aspheric surfaces.

In the invention, it is important that he following condition (1) should be satisfied:

$$\theta < 50° \tag{1}$$

Here θ is the angle of the axial chief ray leaving the center of the display surface of the reflection type image display device with respect to the normal to the image display device. At greater than the upper limit of 50°, some problems such as low-contrast images arise when the reflection type image display device used is unsatisfactory in terms of angle-of-field performance, with the result that any clear-cut image cannot be presented to the observer.

More preferably, it is important to satisfy the following condition (1-1):

$$\theta < 30° \quad (1\text{-}1).$$

The meaning of the upper limit to this condition is the same as mentioned above.

Ever more preferably, it is important to satisfy the following condition (1-2):

$$\theta < 10° \quad (1\text{-}2).$$

The meaning of the upper limit to this condition is the same as mentioned above.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
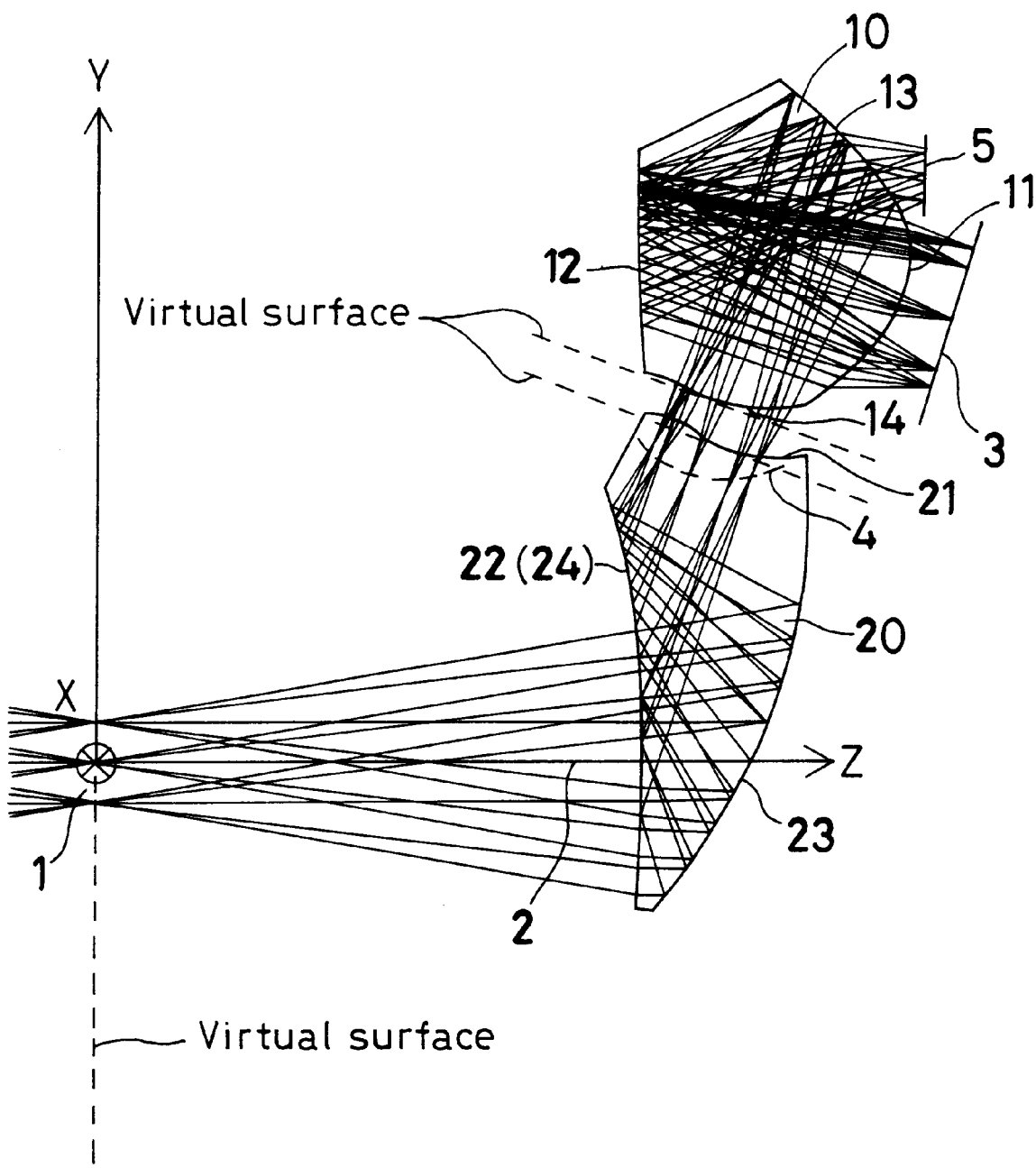
FIG. 1 is an optical path diagram for Example 1 of the image display apparatus according to the invention.

In what follows, the present invention is first explained with reference to Numerical Examples 1 to 6. Throughout Examples 1 to 4 showing constructive parameters, an axial chief ray 2 is defined by a light ray leaving the center of an object, passing through the center of an exit pupil 1 of an ocular optical element and arriving at the center of an image plane (image display surface) 3 according to back ray tracing as shown in FIG. 1. Passing through points of intersection of the axial chief ray 2 with a surface of the exit pupil 1 and an exit surface of a first prism member 20, and an entrance (fourth) surface 14, a virtual surfaces is assumed for the surface of the exit pupil 1. Virtual surfaces are also assumed for the entrance surface in the vertical direction with respect to the axial chief ray 1 incident thereon, and for the exit surface in the vertical direction with respect to the axial chief ray 1 leaving that surface. Here assume that the point of intersection of each virtual surface is defined as the origin of a portion of the decentered optical surface from an optical surface passing through that point of intersection to the next virtual surface (the image plane for the final virtual surface). For the virtual surface prescribed with respect to the points of intersection of the axial chief ray with the entrance surface and the exit surface, the direction along the incident axial chief ray 1 is defined as the Z-axis direction; for the first virtual surface passing through the point of intersection of the axial chief ray 1 with the surface of the exit pupil 1, the direction along the direction of propagation of the axial chief ray 1 is defined as the Z-axis direction; and for the first virtual surface passing through the point of intersection of the axial chief ray 1 with the surface of the pupil 2, the direction along the direction of propagation of the axial chief ray 1 is defined as the Z-axis position direction. For other virtual surface, assume that when the number of reflection in an optical path from the first virtual surface to that virtual surface is an even number, the direction along the direction of propagation of the axial chief ray 1 is defined as the positive Z-axis direction, and when the number of reflection is an odd number, the direction opposite to the direction of propagation of the axial chief ray 1 is defined as the positive Z-axis direction. Further, assume that the plane including this Z-axis and the center of the image plane is defined as the Y-Z plane; the direction perpendicular to the Y-Z plane through the origin and coming out of the back side of the paper is defined as the positive X-axis direction; and the axis forming right-handed orthogonal coordinates with the X- and Z-axes is defined as the Y-axis. Illustrated in FIG. 1 are the virtual surfaces, and the coordinate system with respect the first virtual surface prescribed for the point of intersection of the axial chief ray with the surface of the exit pupil 1. In FIGS. 2 to 6, however, these virtual surfaces and coordinate systems are not shown.

Figure 5:
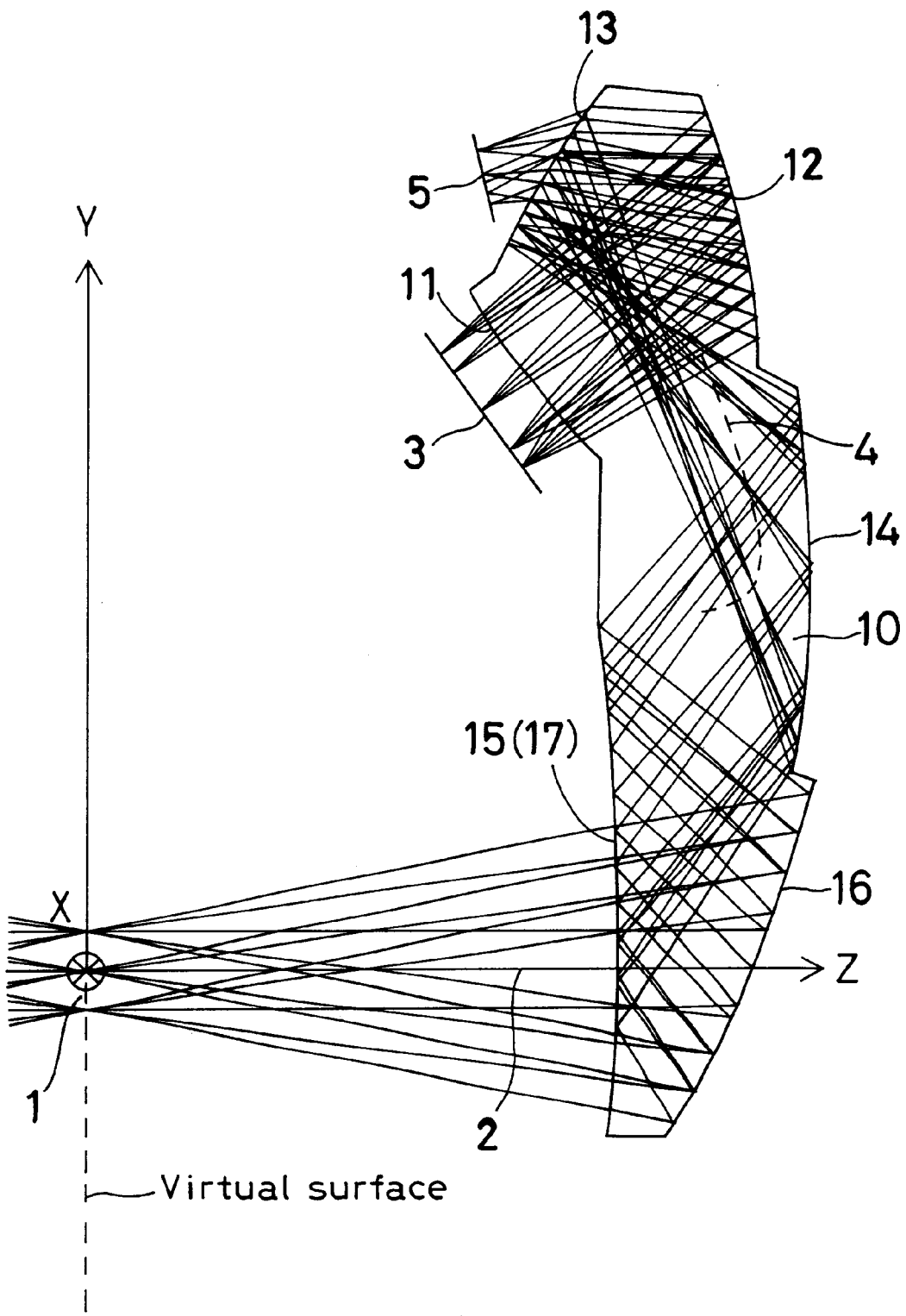
FIG. 5 is an optical path diagram for Example 5 of the image display apparatus according to the invention.

In Examples 5 and 6 concerning the constructive parameters given later and shown in FIG. 5, an axial chief ray 2 is defined by a light ray passing through the center of an ocular optical system and arriving at the center of an image plane 3 (image display device) as viewed in a back ray tracing mode. Passing thorough the point of intersection of the axial chief ray 2 with a surface of the exit pupil 1, a virtual surface is assumed vertically with respect to the axial chief ray 2 incident on the surface of the exit pupil 1. Now the point of intersection of this virtual surface is defined as the origin of a decentered optical element between it and the image plane; the direction along the axial chief ray 2 incident on the prism member 10 is defined as the positive Z-axis direction; the direction passing through the origin, intersecting at right angles with respect to the Y-Z plane and coming out of the back side of the paper is defined as the positive X-axis direction; and an axis forming a right-hand orthogonal coordinate system with the X- and Z-axis is defined as the Y-axis. In FIG. 5, these virtual surfaces, and a coordinate system with respect to the virtual surface prescribed for the point of intersection of the surface of the exit pupil 1 are shown. These virtual surfaces and such a coordinate system are not shown in FIG. 6.

In Examples 1 to 6, each surface is decentered in the Y-Z plane, and the only one symmetric plane of each rotationally asymmetric free-form surface is defined by the Y-Z plane.

Given to each decentered surface are the amount of decentration of the vertex position of the surface from the origin of the corresponding coordinate system (X, Y, and Z in the X-, Y-, and Z-axis directions) and the center axis of the surface (given to the free-form surface are tilt angles with respect to the X-, Y-, and Z-axes in the aforesaid equation (a); $\alpha°$, $\beta°$, and $\gamma°$). It is here noted that the positive $\alpha$ and $\beta$ mean counterclockwise rotation with respect to their positive axis directions, and the positive $\gamma$ means clockwise rotation with respect to the positive Z-axis direction.

It is noted that when, of the optical action surfaces forming the optical system in each example, a certain specific surface (including a virtual surface therefor) and the subsequent surface form a co-axial optical system, the surface separation therebetween as well as the index of refraction and Abbe constant of the medium are given thereto according to conventional methods.

The shape of the free-form surface used herein is defined by the aforesaid equation (a), and the Z-axis therein provides the axis of the free-form surface.

It is noted that the terms with respect to free-form surfaces without data are zero. The indices of refraction given are on a d-line (587.56 nm wavelength) basis, and the lengths are given in mm.

The free-form surface may also be defined by other defining equations, for instance, Zernike polynominal (b). For example, the shape of the free-form surface may be defined by the following equation. The axis in Zernike polynomial is given by the Z-axis in this defining equation. The rotationally asymmetric surface is defined by the polar coordinates for the Z-axis height with respect to the X-Y plane. A is a distance from the Z-axis within the X-Y plane, and R is an azimuthal angle around the Z-axis, as represented by an angle of rotation as measured with respect to the Z-axis.

$x = R \times \text{Cos}(A)$ $y = R \times \sin(A)$ $Z = D_2$ $+ D_3 R \cos(A) + D_4 R \sin(A)$ $+ D_5 R^2 \cos(2A) + D_6(R^2-1) + D_7 R^2 \sin(2A)$ $+ D_8 R^3 \cos(3A) + D_9(3R^3-2R)\cos(A)$ $+ D_{10}(3R^3-2R)\sin(A) + D_{11}R^3\sin(3A)$ $+ D_{12}R^4\cos(4A) + D_{13}(4R^4-3R^2)\cos(2A)$ $+ D_{14}(6R^4-6R^2+1) + D_{15}(4R^4-3R^2)\sin(2A)$ $+ D_{16}R^4\sin(4A)$ $+ D_{17}R^5\cos(5A) + D_{18}(5R^5-4R^3)\cos(3A)$ $+ D_{19}(10R^5-12R^3+3R)\cos(A)$ $+ D_{20}(10R^5-12R^3+3R)\sin(A)$ $+ D_{21}(5R^5-4R^3)\sin(3A) + D_{22}R^5\sin(5A)$ $+ D_{23}R^6\cos(6A) + D_{24}(6R^6-5R^4)\cos(4A)$ $+ D_{25}(15R^6-20R^4+6R^2)\cos(2A)$ $+ D_{26}(20R^6-30R^4+12R^2-1)$ $+ D_{27}(15R^6-20R^4+6R^2)\sin(2A)$ $+ D_{28}(6R^6-5R^4)\sin(4A) + D_{29}R^5\sin(6A)$ (b).

To design an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$, ... should be used.

Further, the free-form surface may be defined by the following defining equation (d):

$Z = \Sigma\Sigma C_{nm} XY.$

For instance, this equation may be expanded with respect to k=7 (seventh term) to obtain:

$$Z = C_2 + C_3 y + C_4|x| + C_5 y^2 + C_6 y|x| + C_7 x^2 + C_8 y^3 + \qquad (c)$$
$$C_9 y^2|x| + C_{10} yx^2 + C_{11}|x^3| + C_{12} y^4 + C_{13} y^3|x| +$$
$$C_{14} y^2 x^2 + C_{15} y|x^3| + C_{16} x^4 + C_{17} y^5 + C_{18} y^4|x| +$$
$$C_{19} y^3 x^2 + C_{20} y^2|x^3| + C_{21} yx^4 + C_{22}|x^5| + C_{23} y^6 +$$
$$C_{24} y^5|x| + C_{25} y^4 x^2 + C_{26} y^3|x^3| + C_{27} y^2 x^4 + C_{28} y^4|x^5| +$$
$$C_{29} x^6 + C_{30} y^7 + C_{31} y^6|x| + C_{32} y^5 x^2 + C_{33} y^4|x^3| +$$
$$C_{34} y^3 x^4 + C_{35} y^2|x^5| + C_{36} yx^6 + C_{37}|x^7|.$$

While, in the examples to be described later, the surface shape is expressed in terms of the free-form surface defined by equation (a), it should be understood that the same advantages are achievable even with equations (b) and (c).

In Examples 1 and 2, the viewing angle is 12.5° in terms of the horizontal half angle of view and 9.44° in terms of the vertical half angle of view, and the image display device has a size of 9.55×7.16 mm with a pupil diameter of 4 mm.

In Examples 3 to 6, the viewing angle is 15° in terms of the horizontal half angle of view and 11.36° in terms of the vertical half angle of view, and the image display device has a size of 9.55×7.16 mm with a pupil diameter of 4 mm.

Y-X sectional diagrams for Examples 1 to 6 including optical axes are attached hereto as FIGS. 1 to 6, respectively.

Figure 2:
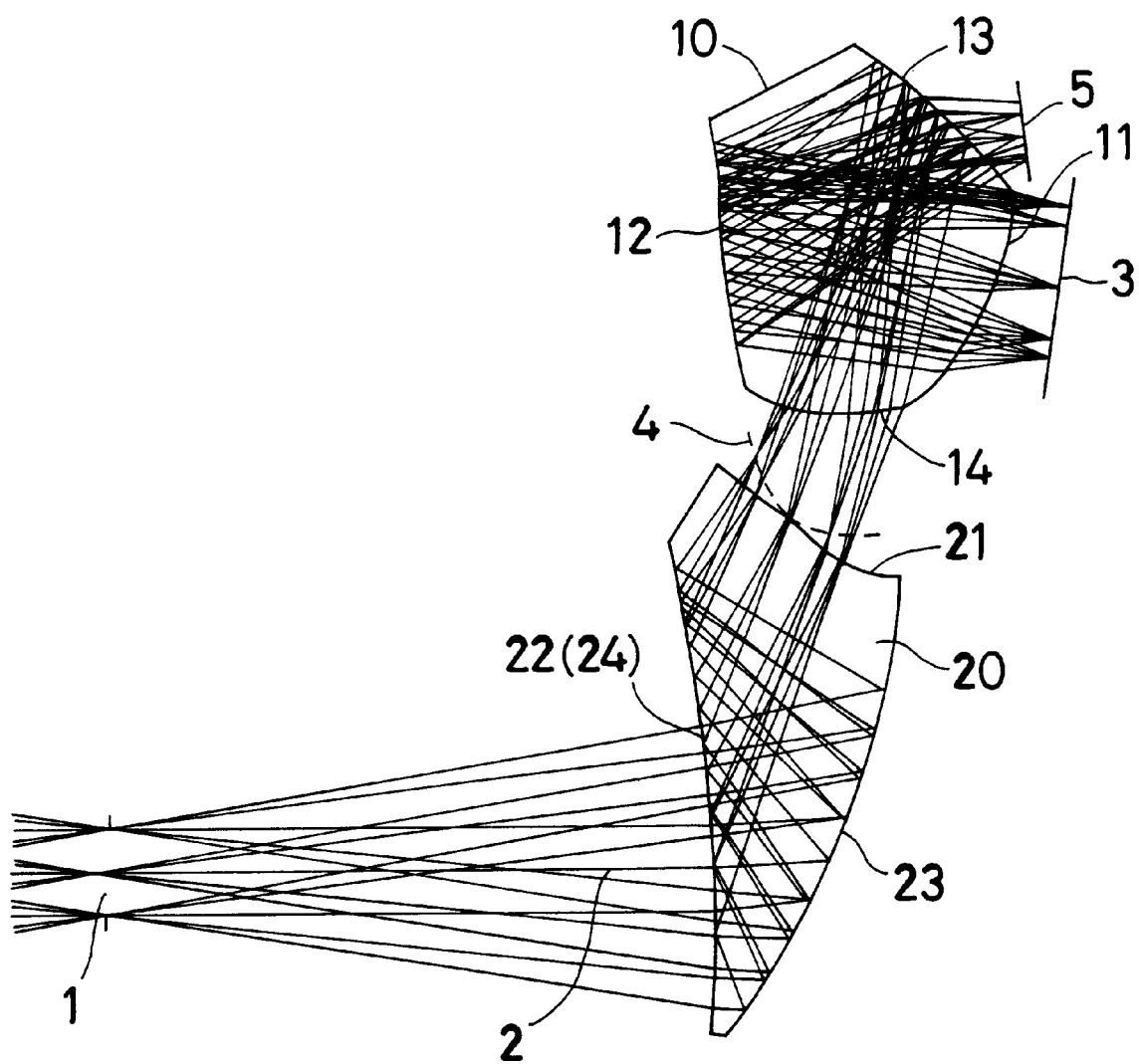
FIG. 2 is an optical path diagram for Example 2 of the image display apparatus according to the invention.
Figure 3:
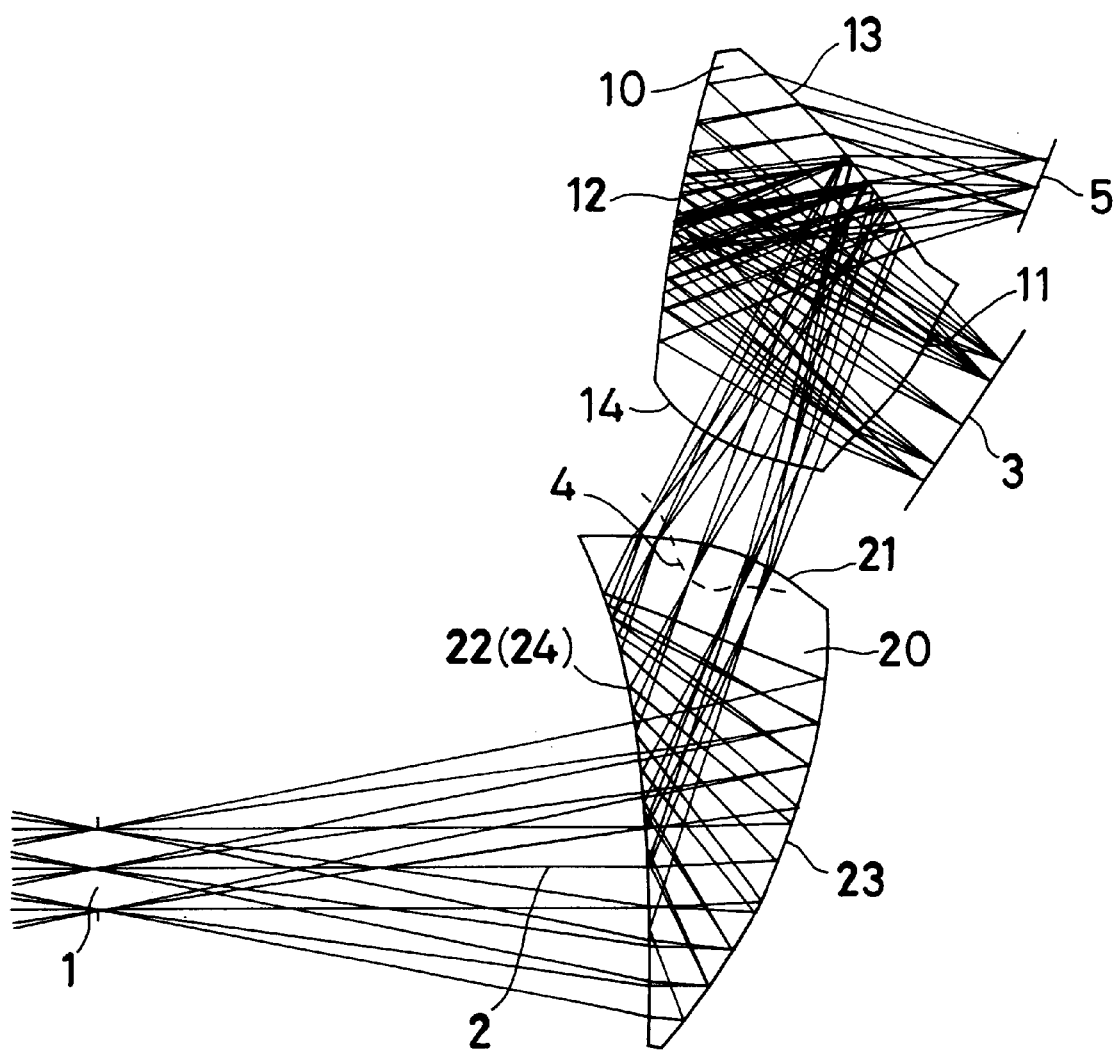
FIG. 3 is an optical path diagram for Example 3 of the image display apparatus according to the invention.

As shown in FIGS. 1 to 3, Examples 1 to 3 are each directed to an image display apparatus made up of a first prism member 10 consisting of four optical surfaces 11 to 14 while a space defined by these four surfaces 11 to 14 is filled with a transparent medium having a refractive index of at least 1, and a second prism member 20 consisting of three surfaces 21 to 23 while a space defined by these three surfaces 21 to 23 is filled with a transparent medium having a refractive index of at least 1. As viewed according to back ray tracing, an axial chief ray 2 passing through an exit pupil 1 enters the second prism member 20 upon incidence on the fourth surface 24 thereof having a transmitting action. The incident ray is reflected at the third surface 23 that is a reflecting surface located farther off the exit pupil 1 and having only a reflecting action, propagating in a direction toward the exit pupil 1. Then, the reflected ray is again reflected at the second surface 22 that also serves as a fourth surface 24 and has a total reflecting action, propagating in a direction away from the exit pupil 1. Then, the reflected ray leaves the second prism member 20 through the first surface 21 having only a transmitting action. Then, the emergent ray enters the first prism member 10 upon incidence on the fourth surface 14 thereof having a transmitting action. Then, the incident ray is reflected at the third surface 13 that is a half-coated mirror surface, propagating in a direction toward the exit pupil 1. Then, the reflected ray is again reflected at the second surface 12 having only a reflecting action, propagating in a direction away from the exit pupil 1. Then, the reflected ray leaves the first prism member 10 through the first surface 11 having only a transmitting action, arriving at a display surface of a reflection-type -LCD 3 located at an image plane position, at which display surface the ray is directly reflected, entering the first prism member 10 through the first surface 11. Then, the incident ray is reflected at the second surface 12, leaving the first prism member 10 through the half-coated surface or third surface 13, and arriving at a surface illuminant 5 located in front of the third surface 13. It is here noted that in Example 1 a curved intermediate image plane 4 is formed between the second surface 22 and the first surface 21 of the second prism member 20; in Example 2 a curved intermediate image plane 4 is formed between the first surface 21 of the second prism member 20 and the fourth surface 14 of the first prism member 10; and in Example 3 one part of a curved intermediate image plane 4 is formed between the second surface 22 and the first surface 21 of the second prism member 20 while another part is formed between the first surface 21 of the second prism member 20 and the fourth surface 14 of the first prism member 10.

Actually, light from the light source 5 enters the first prism member 10 through the half-coated mirror 13, in which it is reflected at the second surface 12, and then leaves the first surface 11 to illuminate the reflection-type LCD 3. Emergent display light leaving the LCD 3 is now refracted through the first surface 11, entering the first prism member 10. Then, the light traces back the aforesaid optical path, so that an image can be magnified and projected into the eyeball of the observer whose pupil is located at the position of the exit pupil 1. It is here noted that θ in condition (1) is 6.97° in Example 1, 7.87° in Example 2, and 0.25° in Example 3.

Figure 4:
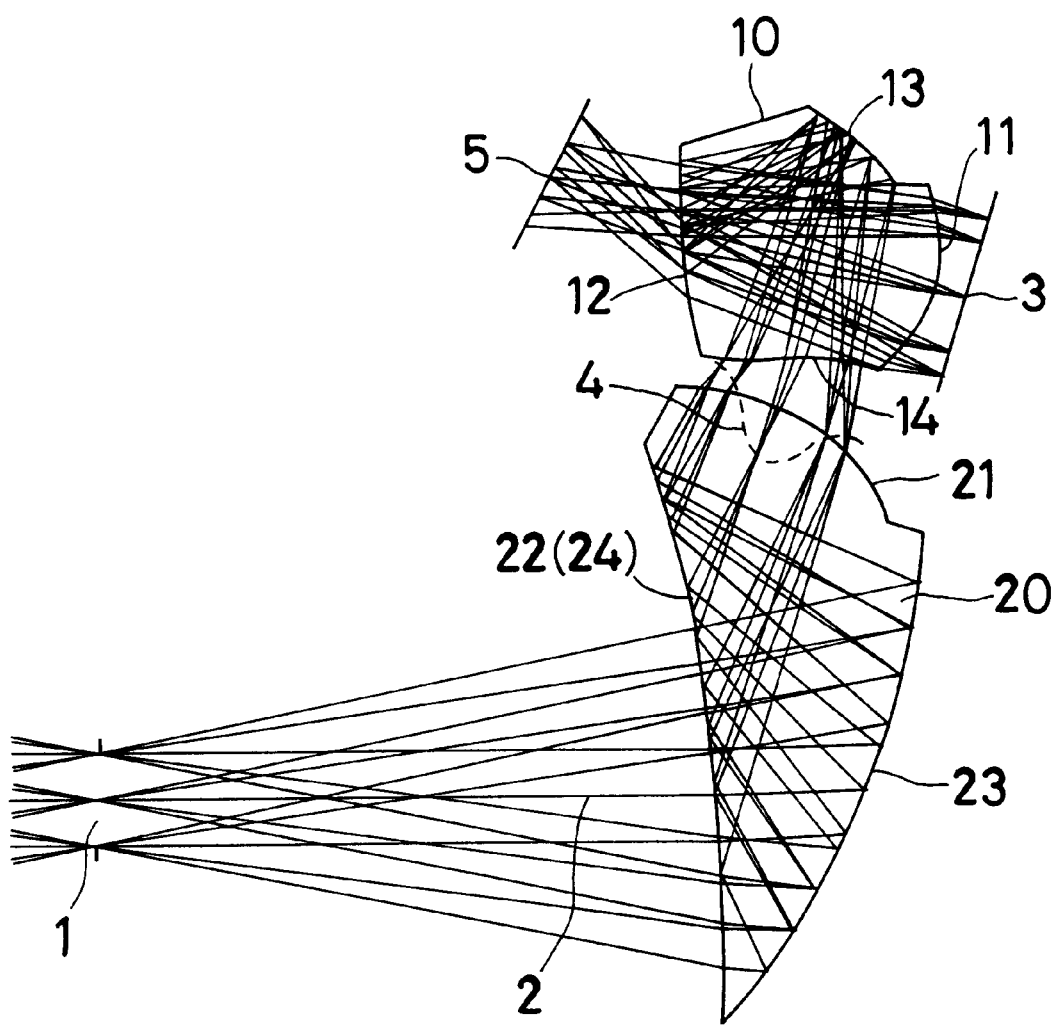
FIG. 4 is an optical path diagram for Example 4 of the image display apparatus according to the invention.

As shown in FIG. 4, Example 4 is directed to an image display apparatus made up of a first prism member 10 consisting of four optical surfaces 11 to 14 while a space defined by these four surfaces 11 to 14 is filled with a transparent medium having a refractive index of at least 1, and a second prism member 20 consisting of three surfaces 21 to 23 while a space defined by these three surfaces 21 to 23 is filled with a transparent medium having a refractive index of at least 1. As viewed according to back ray tracing, an axial chief ray 2 passing through an exit pupil 1 enters the second prism member 20 upon incidence on the fourth surface 24 thereof having a transmitting action. The incident ray is reflected at the third surface 23 that is a reflecting surface located farther off the exit pupil 1 and having only a reflecting action, propagating in a direction toward the exit pupil 1. Then, the reflected ray is again reflected at the second surface 22 that also serves as a fourth surface 24 and has a total reflecting action, propagating in a direction away from the exit pupil 1. Then, the reflected ray leaves the second prism member 20 through the first surface 21 having only a transmitting action. Then, the emergent ray enters the first prism member 10 upon incidence on the fourth surface 14 thereof having a transmitting action. Then, the incident ray is reflected at the third surface 13 that is a reflecting surface, propagating in a direction toward the exit pupil 1. Then, the reflected ray is again reflected at the second surface 12 or half-coated mirror surface, propagating in a direction away from the exit pupil 1. Then, the reflected ray leaves the first prism member 10 through the first surface 11 having only a transmitting action, arriving at a display surface of a reflection-type LCD 3 located at an image plane position, at which display surface the ray is directly reflected, entering the first prism member 10 through the first surface 11. Then, the incident ray leaves the first prism member 10 through the second surface or half-coated mirror 12, arriving at a surface illuminant 5 located in front of the third surface 13. It is here noted that in Example 4 one part of a curved intermediate image plane 4 is formed between the second surface 22 and the first surface 21 of the second prism member 20 while another part is formed between the first surface 21 of the second prism member 20 and the fourth surface 14 of the first prism member 10.

Actually, light from a light source 5 enters the first prism member 10 through the half-coated mirror surface 12, and then leaves the first surface 11 to illuminate the reflection-type LCD 3. Emergent display light leaving the LCD 3 is now refracted through the first surface 11, entering the first prism member 10. Then, the light traces back the aforesaid optical path, so that an image can be magnified and projected into the eyeball of the observer whose pupil is located at the position of the exit pupil 1. It is here noted that θ in condition (1) is 3.44° in Example 4.

As shown in FIG. 5, Example 5 is directed to an image display apparatus made up of a prism member 10 consisting of six optical surfaces 11 to 16 while a space defined by such surfaces is filled with a transparent medium having a refractive index of at least 1. As viewed according to back ray tracing, an axial chief ray 2 passing through an exit pupil 1 enters the prism member 10 upon incidence on a seventh surface 17 thereof having a transmitting action. The incident ray is reflected at the sixth surface 16 that is located on a side farther off the exit pupil 1 and has only a reflecting action, propagating in a direction toward the exit pupil 1. Then, the reflected ray is again reflected at the fifth surface 15 that also serves as the seventh surface 17 and is a total reflecting surface, propagating in a direction away from the exit pupil 1. Then, the reflected ray is again reflected at the fourth reflecting surface 14, propagating in a direction away from the fifth surface 15. Then, the reflected ray is now reflected at the second reflecting surface 12, propagating in a direction toward the pupil 1. Then, the reflected ray leaves the prism member 10 through the first surface 11 having only a transmitting action, arriving at a display surface of a reflection-type LCD 3 located at an image plane position, at which display surface the ray is directly reflected, entering the prism member 10 through the first surface 11, in which the ray is reflected at the second surface 12. Then, the reflected ray leaves the prism member 10 through the third surface 13 that is a half-coated mirror surface, finally arriving at a surface illuminant 5 located in front of the third surface 13. In this example, it is noted that a curved intermediate image plane 4 is formed between the fourth surface 14 and the third surface 13.

Actually, light from a light source 5 enters the prism member 10 through the half-coated mirror surface 13, and then leaves the first surface 11 upon reflection at the second surface 12 to illuminate the reflection-type- LCD 3. Emergent display light leaving the LCD 3 is now refracted through the first surface 11, entering the prism member 10. Then, the light traces back the aforesaid optical path, so that an image can be magnified and projected into the eyeball of the observer whose pupil is located at the position of the exit pupil 1. It is here noted that θ in condition (1) is 3.11° in Example 5.

Figure 6:
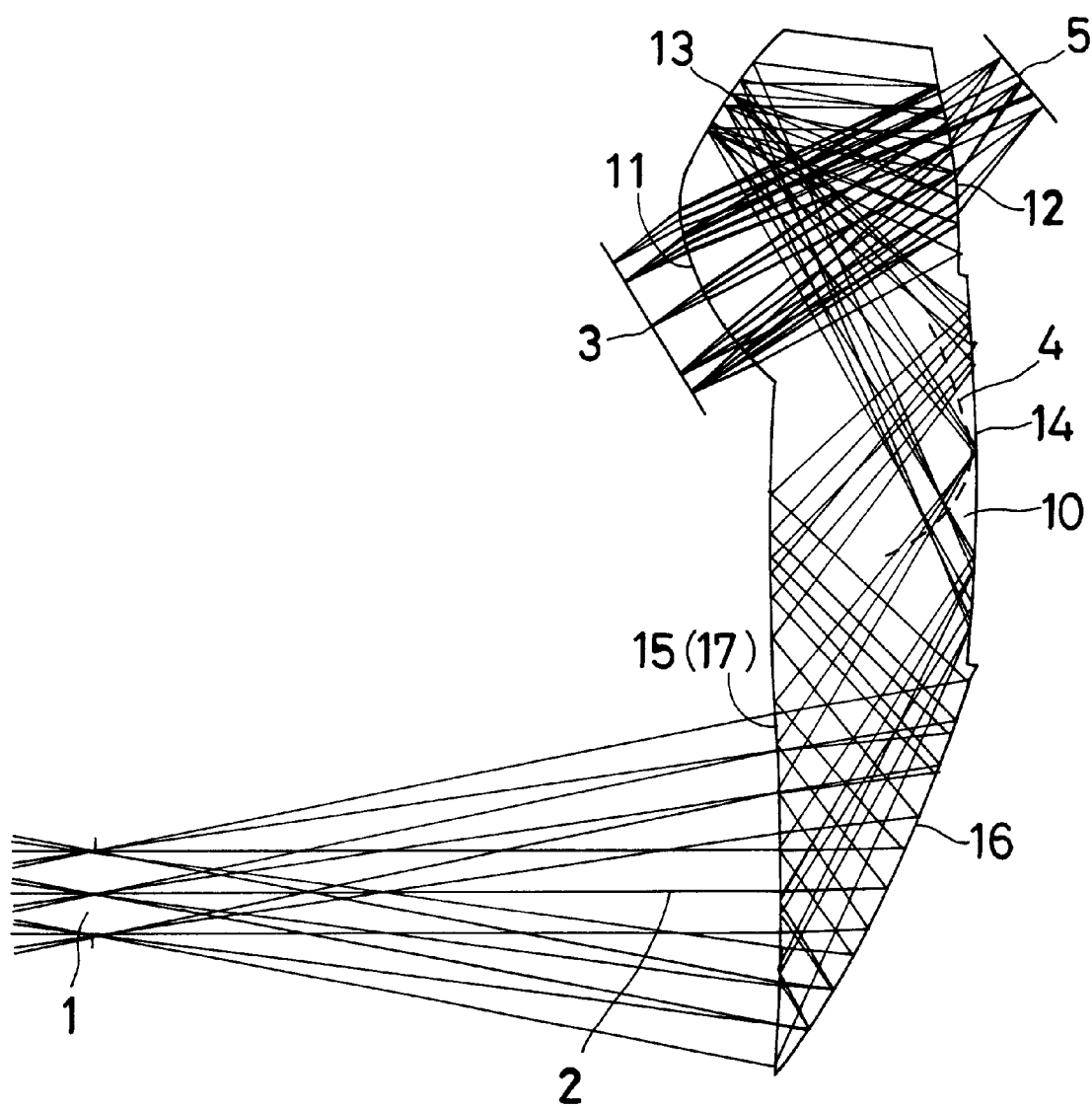
FIG. 6 is an optical path diagram for Example 6 of the image display apparatus according to the invention.

As shown in FIG. 6, Example 6 is directed to an image display apparatus made up of a prism member 10 consisting of six optical surfaces 11 to 16 while a space defined by such surfaces is filled with a transparent medium having a refractive index of at least 1. As viewed according to back ray tracing, an axial chief ray 2 passing through an exit pupil 1 enters the prism member 10 upon incidence on a seventh surface 17 thereof having a transmitting action. The incident ray is reflected at the sixth surface 16 that is located on a side farther off the exit pupil 1 and has only a reflecting action, propagating in a direction toward the exit pupil 1. Then, the reflected ray is again reflected at the fifth surface 15 that also serves as the seventh surface 17 and is a total reflecting surface, propagating in a direction away from the exit pupil 1. Then, the reflected ray is again reflected at the fourth reflecting surface 14, propagating in a direction away from the fifth surface 15. Then, the reflected ray is now reflected at the third reflecting surface 13, propagating in a direction away from the exit pupil 1. Then, the reflected ray is now at the second half-coated mirror surface 12, propagating in a direction toward the exit pupil 1. Then, the reflected ray leaves the prism member 10 through the first surface 11 having only a transmitting action, arriving at a display surface of a reflection-type LCD 3 located at an image plane position, at which display surface the ray is directly reflected, entering the prism member 10 through the first surface 11. Then, the incident ray leaves the prism member 10 through the second half-coated mirror surface 12, finally arriving at a surface illuminant 5 located in front of the second surface 12. In this example, it is noted that a curved intermediate image plane 4 is formed between the fourth surface 14 and the third surface 13.

Actually, light from a light source 5 enters the prism member 10 through the half-coated mirror surface 12, and then leaves the first surface 11 to illuminate the reflection-type LCD 3. Emergent display light leaving the LCD 3 is now refracted through the first surface 11, entering the prism member 10. Then, the light traces back the aforesaid optical path, so that an image can be magnified and projected into the eyeball of the observer whose pupil is located at the position of the exit pupil 1. It is here noted that θ in condition (1) is 0.00° in Example 6.

Set out below are the constructive parameters in Examples 1 to 6. As used hereinafter, the abbreviations "FFS" and "HRP" stand for the "free-form surface" and "virtual surface", respectively.

EXAMPLE 1

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | 0.00 | | | |
| 2 | ∞ (HRP1) | | | | |
| 3 | FFS① | | (1) | 1.4924 | 57.6 |
| 4 | FFS② | | (2) | 1.4924 | 57.6 |
| 5 | FFS① | | (1) | 1.4924 | 57.6 |
| 6 | FFS③ | | (3) | | |
| 7 | ∞ (HRP2) | 1.97 | (4) | | |
| 8 | ∞ (HRP3) | | | | |
| 9 | FFS④ | | (5) | 1.4924 | 57.6 |
| 10 | FFS⑤ | | (6) | 1.4924 | 57.6 |
| 11 | FFS⑥ | | (7) | 1.4924 | 57.6 |
| 12 | FFS⑦ | | (8) | | |
| Image plane | ∞ | | (9) | | |
| 14 | FFS⑦ | | (8) | 1.4924 | 57.6 |
| 15 | FFS⑥ | | (7) | 1.4924 | 57.6 |
| 16 | FFS⑤ | | (6) | | |
| Light source | ∞ | | (10) | | |

FFS①
$C_4$ −1.6593 × 10⁻² $C_6$ −1.1425 × 10⁻² $C_8$ −2.5461 × 10⁻⁴
$C_{10}$ −4.4754 × 10⁻⁴ $C_{11}$ 4.1291 × 10⁻⁶ $C_{13}$ −8.8414 × 10⁻⁷
$C_{15}$ −8.8560 × 10⁻⁶

FFS②
$C_4$ −1.7084 × 10⁻² $C_6$ −1.6340 × 10⁻² $C_8$ −4.6929 × 10⁻⁵
$C_{10}$ −1.0116 × 10⁻⁴ $C_{11}$ −3.2188 × 10⁻⁶ $C_{13}$ −8.3023 × 10⁻⁶
$C_{15}$ −4.6483 × 10⁻⁶

FFS③
$C_4$ 1.4024 × 10⁻² $C_6$ 1.8989 × 10⁻² $C_8$ 3.3173 × 10⁻³
$C_{10}$ −1.5867 × 10⁻² $C_{11}$ 8.8654 × 10⁻⁵ $C_{13}$ −9.6111 × 10⁻⁴
$C_{15}$ −8.0185 × 10⁻⁴

FFS④
$C_4$ 4.6095 × 10⁻² $C_6$ 7.7802 × 10⁻² $C_8$ 4.5502 × 10⁻³
$C_{10}$ −4.3039 × 10⁻³ $C_{11}$ 1.9289 × 10⁻⁴ $C_{13}$ −1.2900 × 10⁻³
$C_{15}$ −3.1692 × 10⁻³

FFS⑤
$C_4$ −1.6612 × 10⁻² $C_6$ −1.9101 × 10⁻² $C_8$ 1.3020 × 10⁻⁴
$C_{10}$ −1.2677 × 10⁻⁴ $C_{11}$ 2.4346 × 10⁻⁵ $C_{13}$ −6.8549 × 10⁻⁶
$C_{15}$ −2.3522 × 10⁻⁵

FFS⑥
$C_4$ 1.6867 × 10⁻² $C_6$ −2.3586 × 10⁻³ $C_8$ −9.6268 × 10⁻⁴
$C_{10}$ −9.2818 × 10⁻⁴ $C_{11}$ −1.3623 × 10⁻⁵ $C_{13}$ 3.3783 × 10⁻⁶
$C_{15}$ −2.5207 × 10⁻⁵

FFS⑦
$C_4$ −1.9825 × 10⁻² $C_6$ −5.3744 × 10⁻² $C_8$ −3.5780 × 10⁻³
$C_{10}$ −4.9290 × 10⁻³ $C_{11}$ −1.8406 × 10⁻⁵ $C_{13}$ 3.0579 × 10⁻⁴
$C_{15}$ −5.7215 × 10⁻⁴

| | Displacement and tilt(1) | | | | |
|---|---|---|---|---|---|
| X | 0.00 | Y | 7.77 | Z | 27.49 |
| α | 7.55 | β | 0.00 | γ | 0.00 |
| | Displacement and tilt(2) | | | | |
| X | 0.00 | Y | 0.04 | Z | 33.63 |
| α | −25.59 | β | 0.00 | γ | 0.00 |
| | Displacement and tilt(3) | | | | |
| X | 0.00 | Y | 16.06 | Z | 31.07 |
| α | 59.71 | β | 0.00 | γ | 0.00 |
| | Displacement and tilt(4) | | | | |
| X | 0.00 | Y | 16.06 | Z | 31.07 |
| α | 70.08 | β | 0.00 | γ | 0.00 |
| | Displacement and tilt(5) | | | | |
| X | 0.00 | Y | 0.00 | Z | 0.00 |
| α | 2.32 | β | 0.00 | γ | 0.00 |
| | Displacement and tilt(6) | | | | |
| X | 0.00 | Y | 0.20 | Z | 15.26 |
| α | −23.73 | β | 0.00 | γ | 0.00 |
| | Displacement and tilt(7) | | | | |
| X | 0.00 | Y | 7.44 | Z | 8.80 |
| α | −70.73 | β | 0.00 | γ | 0.00 |
| | Displacement and tilt(8) | | | | |
| X | 0.00 | Y | −6.73 | Z | 8.00 |

-continued

| | | | | | | |
|---|---|---|---|---|---|---|
| α | −93.06 | β | 0.00 | γ | 0.00 | |
| | | Displacement and tilt(9) | | | | |
| X | 0.00 | Y | −9.72 | Z | 7.91 | |
| α | −86.34 | β | 0.00 | γ | 0.00 | |
| | | Displacement and tilt(10) | | | | |
| X | 0.00 | Y | −5.93 | Z | 14.15 | |
| α | −69.78 | β | 0.00 | γ | 0.00 | |

EXAMPLE 2

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | 0.00 | | | |
| 2 | ∞ (HRP1) | | | | |
| 3 | FFS① | | (1) | 1.4924 | 57.6 |
| 4 | FFS② | | (2) | 1.4924 | 57.6 |
| 5 | FFS① | | (1) | 1.4924 | 57.6 |
| 6 | FFS③ | | (3) | | |
| 7 | ∞ (HRP2) | 5.02 | (4) | | |
| 8 | ∞ (HRP3) | | | | |
| 9 | FFS④ | | (5) | 1.4924 | 57.6 |
| 10 | FFS⑤ | | (6) | 1.4924 | 57.6 |
| 11 | FFS⑥ | | (7) | 1.4924 | 57.6 |
| 12 | FFS⑦ | | (8) | | |
| Image plane | ∞ | | (9) | | |
| 14 | FFS⑦ | | (8) | 1.4924 | 57.6 |
| 15 | FFS⑥ | | (7) | 1.4924 | 57.6 |
| 16 | FFS⑤ | | (6) | | |
| Light source | ∞ | | (10) | | |

FFS①
$C_4$ −1.4946 × 10⁻²  $C_6$ −6.7817 × 10⁻³  $C_8$ −4.2438 × 10⁻⁴
$C_{10}$ 1.2695 × 10⁻⁵  $C_{11}$ −1.5431 × 10⁻⁶  $C_{13}$ −3.8746 × 10⁻⁶
$C_{15}$ 5.1600 × 10⁻⁶
FFS②
$C_4$ −1.5696 × 10⁻²  $C_6$ −1.4376 × 10⁻²  $C_8$ −9.7819 × 10⁻⁵
$C_{10}$ 3.9194 × 10⁻⁵  $C_{11}$ −3.5786 × 10⁻⁶  $C_{13}$ −7.0139 × 10⁻⁷
$C_{15}$ −3.0216 × 10⁻⁶
FFS③
$C_4$ 1.3624 × 10⁻²  $C_6$ −1.6213 × 10⁻²  $C_8$ 1.0082 × 10⁻⁴
$C_{10}$ −4.5556 × 10⁻³  $C_{11}$ −6.5867 × 10⁻⁵  $C_{13}$ −3.4660 × 10⁻⁴
$C_{15}$ 1.1104 × 10⁻³
FFS④
$C_4$ 4.1434 × 10⁻²  $C_6$ 7.8536 × 10⁻²  $C_8$ 2.4448 × 10⁻³
$C_{10}$ 4.8532 × 10⁻⁴  $C_{11}$ 6.8660 × 10⁻⁵  $C_{13}$ −5.7831 × 10⁻⁴
$C_{15}$ −1.5305 × 10⁻³
FFS⑤
$C_4$ −1.4772 × 10⁻²  $C_6$ −1.5749 × 10⁻²  $C_8$ 1.3804 × 10⁻⁴
$C_{10}$ −1.3366 × 10⁻⁴  $C_{11}$ 2.8412 × 10⁻⁵  $C_{13}$ 5.9954 × 10⁻⁶
$C_{15}$ −2.5886 × 10⁻⁵
FFS⑥
$C_4$ 1.5386 × 10⁻²  $C_6$ 1.1723 × 10⁻³  $C_8$ −5.4417 × 10⁻⁴
$C_{10}$ −1.0998 × 10⁻³  $C_{11}$ −1.2975 × 10⁻⁵  $C_{13}$ 3.3937 × 10⁻⁵
$C_{15}$ −5.2231 × 10⁻⁵
FFS⑦
$C_4$ −3.5322 × 10⁻²  $C_6$ −2.9892 × 10⁻²  $C_8$ −8.5512 × 10⁻³
$C_{10}$ −4.9228 × 10⁻³  $C_{11}$ 3.9382 × 10⁻⁵  $C_{13}$ 2.5740 × 10⁻⁴
$C_{15}$ −6.9699 × 10⁻⁴

| | | Displacement and tilt(1) | | | |
|---|---|---|---|---|---|
| X | 0.00 | Y | 7.37 | Z | 28.40 |
| α | 7.45 | β | 0.00 | γ | 0.00 |
| | | Displacement and tilt(2) | | | |
| X | 0.00 | Y | 0.07 | Z | 34.62 |
| α | −24.44 | β | 0.00 | γ | 0.00 |
| | | Displacement and tilt(3) | | | |
| X | 0.00 | Y | 16.15 | Z | 32.59 |
| α | 48.15 | β | 0.00 | γ | 0.00 |
| | | Displacement and tilt(4) | | | |
| X | 0.00 | Y | 16.15 | Z | 32.59 |
| α | 72.95 | β | 0.00 | γ | 0.00 |
| | | Displacement and tilt(5) | | | |
| X | 0.00 | Y | 0.00 | Z | 0.00 |
| α | 8.94 | β | 0.00 | γ | 0.00 |
| | | Displacement and tilt(6) | | | |
| X | 0.00 | Y | 0.83 | Z | 16.07 |
| α | −21.54 | β | 0.00 | γ | 0.00 |
| | | Displacement and tilt(7) | | | |
| X | 0.00 | Y | 7.93 | Z | 9.23 |
| α | −68.54 | β | 0.00 | γ | 0.00 |
| | | Displacement and tilt(8) | | | |
| X | 0.00 | Y | −6.15 | Z | 8.97 |
| α | −93.36 | β | 0.00 | γ | 0.00 |
| | | Displacement and tilt(9) | | | |
| X | 0.00 | Y | −9.14 | Z | 9.09 |
| α | −82.03 | β | 0.00 | γ | 0.00 |
| | | Displacement and tilt(10) | | | |
| X | 0.00 | Y | −5.49 | Z | 15.23 |
| α | −65.26 | β | 0.00 | γ | 0.00 |

EXAMPLE 3

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | 0.00 | | | |
| 2 | ∞ (HRP1) | | | | |
| 3 | FFS① | | (1) | 1.4924 | 57.6 |
| 4 | FFS② | | (2) | 1.4924 | 57.6 |
| 5 | FFS① | | (1) | 1.4924 | 57.6 |
| 6 | FFS③ | | (3) | | |
| 7 | ∞ (HRP2) | 4.96 | (4) | | |
| 8 | ∞ (HRP3) | | | | |
| 9 | FFS④ | | (5) | 1.4924 | 57.6 |
| 10 | FFS⑤ | | (6) | 1.4924 | 57.6 |
| 11 | FFS⑥ | | (7) | 1.4924 | 57.6 |
| 12 | FFS⑦ | | (8) | | |
| Image plane | ∞ | | (9) | | |
| 14 | FFS⑦ | | (8) | 1.4924 | 57.6 |
| 15 | FFS⑥ | | (7) | 1.4924 | 57.6 |
| 16 | FFS⑤ | | (6) | | |
| Light source | ∞ | | (10) | | |

FFS①
$C_4$ −1.4126 × 10⁻²  $C_6$ −1.2307 × 10⁻²  $C_8$ −1.9904 × 10⁻⁴
$C_{10}$ −3.7160 × 10⁻⁴  $C_{11}$ 3.9857 × 10⁻⁶  $C_{13}$ −6.2518 × 10⁻⁷
$C_{15}$ −5.1408 × 10⁻⁶
FFS②
$C_4$ −1.6477 × 10⁻²  $C_6$ −1.5916 × 10⁻²  $C_8$ −2.6334 × 10⁻⁵
$C_{10}$ −3.1617 × 10⁻⁵  $C_{11}$ −2.8046 × 10⁻⁶  $C_{13}$ −8.1883 × 10⁻⁶
$C_{15}$ −3.6911 × 10⁻⁶
FFS③
$C_4$ 1.8445 × 10⁻²  $C_6$ −3.5924 × 10⁻²  $C_8$ 1.2381 × 10⁻³
$C_{11}$ −2.5819 × 10⁻⁴
FFS④
$C_4$ 4.5784 × 10⁻²  $C_6$ 3.3976 × 10⁻²  $C_8$ 4.3026 × 10⁻³
$C_{10}$ 5.3126 × 10⁻³  $C_{11}$ −1.0851 × 10⁻⁴  $C_{13}$ −4.9436 × 10⁻⁴
FFS⑤
$C_4$ −1.3520 × 10⁻²  $C_6$ −1.2413 × 10⁻²  $C_8$ 1.3953 × 10⁻⁴
$C_{10}$ 1.9004 × 10⁻⁴  $C_{11}$ 1.8036 × 10⁻⁵  $C_{12}$ 1.2685 × 10⁻⁵
$C_{13}$ 5.3689 × 10⁻⁶  $C_{15}$ 1.2442 × 10⁻⁵
FFS⑥
$C_4$ 1.3596 × 10⁻²  $C_6$ 6.3897 × 10⁻³  $C_6$ −4.6606 × 10⁻⁴
$C_{10}$ −2.1006 × 10⁻⁴  $C_{11}$ 2.9825 × 10⁻⁶  $C_{13}$ 1.3861 × 10⁻⁵
$C_{15}$ 1.7495 × 10⁻⁵
FFS⑦
$C_4$ −2.3601 × 10⁻²  $C_6$ −3.4733 × 10⁻²  $C_8$ −2.5276 × 10⁻³
$C_{11}$ 1.7531 × 10⁻⁴  $C_{13}$ 3.2991 × 10⁻⁴  $C_{15}$ 4.5350 × 10⁻⁴

-continued

|   | Displacement and tilt(1) | | | | | |
|---|---|---|---|---|---|---|
| X | 0.00 | Y | 7.84 | Z | 27.20 |
| α | 10.16 | β | 0.00 | γ | 0.00 |
|   | Displacement and tilt(2) | | | | | |
| X | 0.00 | Y | 0.09 | Z | 34.40 |
| α | −23.15 | β | 0.00 | γ | 0.00 |
|   | Displacement and tilt(3) | | | | | |
| X | 0.00 | Y | 16.11 | Z | 30.64 |
| α | 74.77 | β | 0.00 | γ | 0.00 |
|   | Displacement and tilt(4) | | | | | |
| X | 0.00 | Y | 16.11 | Z | 30.64 |
| α | 63.81 | β | 0.00 | γ | 0.00 |
|   | Displacement and tilt(5) | | | | | |
| X | 0.00 | Y | 0.00 | Z | 0.00 |
| α | 7.41 | β | 0.00 | γ | 0.00 |
|   | Displacement and tilt(6) | | | | | |
| X | 0.00 | Y | 0.63 | Z | 14.77 |
| α | −24.55 | β | 0.00 | γ | 0.00 |
|   | Displacement and tilt(7) | | | | | |
| X | 0.00 | Y | 8.39 | Z | 8.61 |
| α | −75.16 | β | 0.00 | γ | 0.00 |
|   | Displacement and tilt(8) | | | | | |
| X | 0.00 | Y | −5.47 | Z | 6.47 |
| α | −100.02 | β | 0.00 | γ | 0.00 |
|   | Displacement and tilt(9) | | | | | |
| X | 0.00 | Y | 9.00 | Z | 5.97 |
| α | −98.42 | β | 0.00 | γ | 0.00 |
|   | Displacement and tilt(10) | | | | | |
| X | 0.00 | Y | −7.10 | Z | 18.15 |
| α | −86.79 | β | 0.00 | γ | 0.00 |

EXAMPLE 4

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | 0.00 | | | |
| 2 | ∞ (HRP1) | | | | |
| 3 | FFS① | | (1) | 1.4924 | 57.6 |
| 4 | FFS② | | (2) | 1.4924 | 57.6 |
| 5 | FFS① | | (1) | 1.4924 | 57.6 |
| 6 | FFS③ | | (3) | | |
| 7 | ∞ (HRP2) | 4.96 | (4) | | |
| 8 | ∞ (HRP3) | | | | |
| 9 | FFS④ | | (5) | 1.4924 | 57.6 |
| 10 | FFS⑤ | | (6) | 1.4924 | 57.6 |
| 11 | FFS⑥ | | (7) | 1.4924 | 57.6 |
| 12 | FFS⑦ | | (8) | | |
| Image plane | ∞ | | (9) | | |
| 14 | FFS⑦ | | (8) | 1.4924 | 57.6 |
| 15 | FFS⑥ | | (7) | | |
| Light source | ∞ | | (10) | | |

FFS①
$C_4$ −1.4126 × 10⁻² $C_6$ −1.2307 × 10⁻² $C_8$ −1.9904 × 10⁻⁴
$C_{10}$ −3.7160 × 10⁻⁴ $C_{11}$ 3.9857 × 10⁻⁶ $C_{13}$ −6.2518 × 10⁻⁷
$C_{15}$ −5.1408 × 10⁻⁶
FFS②
$C_4$ −1.6477 × 10⁻² $C_6$ −1.5916 × 10⁻² $C_8$ −2.6334 × 10⁻⁶
$C_{10}$ −3.1617 × 10⁻⁵ $C_{11}$ −2.8046 × 10⁻⁶ $C_{13}$ −8.1883 × 10⁻⁶
$C_{15}$ −3.6911 × 10⁻⁶
FFS③
$C_4$ 1.8445 × 10⁻² $C_6$ −3.5924 × 10⁻² $C_8$ 1.2381 × 10⁻³
$C_{11}$ −2.5819 × 10⁻⁴
FFS④
$C_4$ 4.5784 × 10⁻² $C_6$ 3.3976 × 10⁻² $C_8$ 4.3026 × 10⁻⁴
$C_{10}$ 5.3126 × 10⁻³ $C_{11}$ −1.0851 × 10⁻⁴ $C_{13}$ −4.9436 × 10⁻⁵
FFS⑤
$C_4$ −1.3520 × 10⁻² $C_6$ −1.2413 × 10⁻² $C_8$ 1.3953 × 10⁻⁴
$C_{10}$ 1.9004 × 10⁻⁴ $C_{11}$ 1.8036 × 10⁻⁵ $C_{12}$ 1.2685 × 10⁻⁵

-continued $C_{13}$ 5.3689 × 10⁻⁶ $C_{15}$ 1.2442 × 10⁻⁵
FFS⑥
$C_4$ 1.3596 × 10⁻² $C_6$ 6.3897 × 10⁻³ $C_8$ −4.6606 × 10⁻³
$C_{10}$ −2.1006 × 10⁻⁴ $C_{11}$ 2.9825 × 10⁻⁶ $C_{13}$ 1.3861 × 10⁻⁵
$C_{15}$ 1.7495 × 10⁻⁵
FFS⑦
$C_4$ −2.3601 × 10⁻² $C_6$ −3.4733 × 10⁻² $C_8$ −2.5276 × 10⁻³
$C_{11}$ 1.7531 × 10⁻⁴ $C_{13}$ 3.2991 × 10⁻⁴ $C_{15}$ 4.5350 × 10⁻⁴

|   | Displacement and tilt(1) | | | | | |
|---|---|---|---|---|---|---|
| X | 0.00 | Y | 7.84 | Z | 27.20 |
| α | 10.16 | β | 0.00 | γ | 0.00 |
|   | Displacement and tilt(2) | | | | | |
| X | 0.00 | Y | 0.09 | Z | 34.40 |
| α | −23.15 | β | 0.00 | γ | 0.00 |
|   | Displacement and tilt(3) | | | | | |
| X | 0.00 | Y | 16.11 | Z | 30.64 |
| α | 74.77 | β | 0.00 | γ | 0.00 |
|   | Displacement and tilt(4) | | | | | |
| X | 0.00 | Y | 16.11 | Z | 30.64 |
| α | 63.81 | β | 0.00 | γ | 0.00 |
|   | Displacement and tilt(5) | | | | | |
| X | 0.00 | Y | 0.00 | Z | 0.00 |
| α | 7.41 | β | 0.00 | γ | 0.00 |
|   | Displacement and tilt(6) | | | | | |
| X | 0.00 | Y | 0.63 | Z | 14.77 |
| α | −24.55 | β | 0.00 | γ | 0.00 |
|   | Displacement and tilt(7) | | | | | |
| X | 0.00 | Y | 8.39 | Z | 8.61 |
| α | −75.16 | β | 0.00 | γ | 0.00 |
|   | Displacement and tilt(8) | | | | | |
| X | 0.00 | Y | −5.47 | Z | 6.47 |
| α | −100.02 | β | 0.00 | γ | 0.00 |
|   | Displacement and tilt(9) | | | | | |
| X | 0.00 | Y | −9.00 | Z | 5.97 |
| α | −98.42 | β | 0.00 | γ | 0.00 |
|   | Displacement and tilt(10) | | | | | |
| X | 0.00 | Y | −7.10 | Z | 18.15 |
| α | −86.79 | β | 0.00 | γ | 0.00 |

EXAMPLE 5

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | 0.00 | | | |
| 2 | ∞ (HRP1) | | | | |
| 3 | FFS① | | (1) | 1.5254 | 56.2 |
| 4 | FFS② | | (2) | 1.5254 | 56.2 |
| 5 | FFS① | | (1) | 1.5254 | 56.2 |
| 6 | FFS③ | | (3) | 1.5254 | 56.2 |
| 7 | FFS④ | | (4) | 1.5254 | 56.2 |
| 8 | FFS⑤ | | (5) | 1.5254 | 56.2 |
| 9 | FFS⑥ | | (6) | | |
| Image plane | ∞ | | (7) | | |
| 11 | FFS⑥ | | (6) | 1.5254 | 56.2 |
| 12 | FFS⑤ | | (5) | 1.5254 | 56.2 |
| 13 | FFS④ | | (4) | | |
| Light source | ∞ | | (8) | | |

FFS①
$C_4$ −2.2937 × 10⁻² $C_6$ −2.6564 × 10⁻³ $C_6$ −7.0568 × 10⁻⁴
$C_{10}$ 1.2916 × 10⁻⁴ $C_{11}$ 1.8506 × 10⁻⁶ $C_{13}$ −1.1220 × 10⁻⁵
$C_{15}$ −2.2092 × 10⁻⁶
FFS②
$C_4$ −1.6635 × 10⁻² $C_6$ −8.9711 × 10⁻³ $C_8$ −4.5043 × 10⁻⁵
$C_{10}$ 1.9808 × 10⁻⁴ $C_{11}$ −3.2622 × 10⁻⁶ $C_{13}$ 1.5683 × 10⁻⁶
$C_{15}$ −4.7889 × 10⁻⁶
FFS③
$C_4$ −8.4955 × 10⁻³ $C_6$ −1.0326 × 10⁻² $C_8$ −2.2057 × 10⁻⁴

-continued

| | | | | | |
|---|---|---|---|---|---|
| $C_{10}$ | $-1.0761 \times 10^{-4}$ | $C_{11}$ | $-2.5356 \times 10^{-6}$ | $C_{13}$ | $-2.7066 \times 10^{-5}$ |
| $C_{15}$ | $1.2656 \times 10^{-5}$ | | | | |
| FFS④ | | | | | |
| $C_4$ | $9.4722 \times 10^{-3}$ | $C_6$ | $1.3989 \times 10^{-2}$ | $C_8$ | $1.4029 \times 10^{-5}$ |
| $C_{10}$ | $-4.8567 \times 10^{-5}$ | $C_{11}$ | $-1.8202 \times 10^{-5}$ | $C_{13}$ | $-2.2374 \times 10^{-5}$ |
| $C_{15}$ | $1.4517 \times 10^{-5}$ | | | | |
| FFS⑤ | | | | | |
| $C_4$ | $-1.7515 \times 10^{-2}$ | $C_6$ | $-1.0492 \times 10^{-2}$ | $C_8$ | $3.1133 \times 10^{-4}$ |
| $C_{10}$ | $6.5212 \times 10^{-4}$ | $C_{11}$ | $-1.7243 \times 10^{-6}$ | $C_{13}$ | $-4.0331 \times 10^{-5}$ |
| $C_{15}$ | $6.9979 \times 10^{-6}$ | | | | |
| FFS⑥ | | | | | |
| $C_4$ | $6.6453 \times 10^{-2}$ | $C_6$ | $-1.1481 \times 10^{-2}$ | $C_8$ | $1.2294 \times 10^{-3}$ |
| $C_{10}$ | $9.9810 \times 10^{-4}$ | $C_{11}$ | $-2.5557 \times 10^{-4}$ | $C_{13}$ | $-1.0173 \times 10^{-3}$ |
| $C_{15}$ | $6.2221 \times 10^{-4}$ | | | | |

| | | | Displacement and tilt(1) | | | |
|---|---|---|---|---|---|---|
| X | 0.00 | Y | 7.23 | Z | 27.75 |
| α | 3.55 | β | 0.00 | γ | 0.00 |
| | | | Displacement and tilt(2) | | |
| X | 0.00 | Y | 0.00 | Z | 35.05 |
| α | -22.36 | β | 0.00 | γ | 0.00 |
| | | | Displacement and tilt(3) | | |
| X | 0.00 | Y | 20.24 | Z | 37.97 |
| α | -0.60 | β | 0.00 | γ | 0.00 |
| | | | Displacement and tilt(4) | | |
| X | 0.00 | Y | 39.91 | Z | 23.16 |
| α | -29.52 | β | 0.00 | γ | 0.00 |
| | | | Displacement and tilt(5) | | |
| X | 0.00 | Y | 38.75 | Z | 34.15 |
| α | 14.98 | β | 0.00 | γ | 0.00 |
| | | | Displacement and tilt(6) | | |
| X | 0.00 | Y | 30.74 | Z | 23.13 |
| α | 39.43 | β | 0.00 | γ | 0.00 |
| | | | Displacement and tilt(7) | | |
| X | 0.00 | Y | 28.98 | Z | 20.53 |
| α | 37.27 | β | 0.00 | γ | 0.00 |
| | | | Displacement and tilt(8) | | |
| X | 0.00 | Y | 40.93 | Z | 20.79 |
| α | 12.89 | β | 0.00 | γ | 0.00 |

EXAMPLE 6

| Surface No. | Radius of curvature | Surface separation | Displacement and tilt | Refractive index | Abbe's No. |
|---|---|---|---|---|---|
| Object plane | ∞ | -1000.00 | | | |
| 1 | ∞ (Pupil) | 0.00 | | | |
| 2 | ∞ (HRP1) | | | | |
| 3 | FFS① | | (1) | 1.5254 | 56.2 |
| 4 | FFS② | | (2) | 1.5254 | 56.2 |
| 5 | FFS① | | (1) | 1.5254 | 56.2 |
| 6 | FFS③ | | (3) | 1.5254 | 56.2 |
| 7 | FFS④ | | (4) | 1.5254 | 56.2 |
| 8 | FFS⑤ | | (5) | 1.5254 | 56.2 |
| 9 | FFS⑥ | | (6) | | |
| Image plane | ∞ | | (7) | | |
| 11 | FFS⑥ | | (6) | 1.5254 | 56.2 |
| 12 | FFS⑤ | | (5) | | |
| Light source | ∞ | | (8) | | |

| | | | | | |
|---|---|---|---|---|---|
| FFS① | | | | | |
| $C_4$ | $-3.0837 \times 10^{-2}$ | $C_6$ | $-9.1583 \times 10^{-4}$ | $C_8$ | $-9.7724 \times 10^{-4}$ |
| $C_{10}$ | $6.9308 \times 10^{-5}$ | $C_{11}$ | $-6.9469 \times 10^{-6}$ | $C_{13}$ | $-1.4928 \times 10^{-5}$ |
| $C_{15}$ | $1.8054 \times 10^{-6}$ | | | | |
| FFS② | | | | | |
| $C_4$ | $-2.0865 \times 10^{-2}$ | $C_6$ | $-9.1285 \times 10^{-3}$ | $C_8$ | $-5.2444 \times 10^{-5}$ |
| $C_{10}$ | $1.1223 \times 10^{-4}$ | $C_{11}$ | $-5.5844 \times 10^{-6}$ | $C_{13}$ | $3.9626 \times 10^{-6}$ |
| $C_{15}$ | $1.1827 \times 10^{-6}$ | | | | |
| FFS③ | | | | | |
| $C_4$ | $-7.4281 \times 10^{-3}$ | $C_6$ | $-4.5776 \times 10^{-3}$ | $C_8$ | $-3.1974 \times 10^{-4}$ |
| $C_{10}$ | $-1.6835 \times 10^{-4}$ | $C_{11}$ | $-2.3642 \times 10^{-5}$ | $C_{13}$ | $-1.1798 \times 10^{-5}$ |

-continued

| | | | | | |
|---|---|---|---|---|---|
| $C_{15}$ | $8.1846 \times 10^{-6}$ | | | | |
| FFS④ | | | | | |
| $C_4$ | $1.1436 \times 10^{-2}$ | $C_6$ | $1.5335 \times 10^{-2}$ | $C_8$ | $-6.0769 \times 10^{-5}$ |
| $C_{10}$ | $1.1069 \times 10^{-4}$ | $C_{11}$ | $2.9071 \times 10^{-5}$ | $C_{13}$ | $-2.7771 \times 10^{-5}$ |
| $C_{15}$ | $2.4877 \times 10^{-5}$ | | | | |
| FFS⑤ | | | | | |
| $C_4$ | $-1.5262 \times 10^{-2}$ | $C_6$ | $-7.9428 \times 10^{-3}$ | $C_8$ | $6.4804 \times 10^{-5}$ |
| $C_{10}$ | $1.1187 \times 10^{-3}$ | $C_{11}$ | $4.7027 \times 10^{-5}$ | $C_{13}$ | $-6.0108 \times 10^{-5}$ |
| $C_{15}$ | $3.1778 \times 10^{-5}$ | | | | |
| FFS⑥ | | | | | |
| $C_4$ | $9.4876 \times 10^{-2}$ | $C_6$ | $3.8501 \times 10^{-2}$ | $C_8$ | $3.9895 \times 10^{-3}$ |
| $C_{10}$ | $2.3815 \times 10^{-3}$ | $C_{11}$ | $1.6396 \times 10^{-4}$ | $C_{13}$ | $4.1604 \times 10^{-4}$ |
| $C_{15}$ | $1.9210 \times 10^{-4}$ | | | | |

| | | | Displacement and tilt(1) | | |
|---|---|---|---|---|---|
| X | 0.00 | Y | 7.08 | Z | 33.36 |
| α | 1.19 | β | 0.00 | γ | 0.00 |
| | | | Displacement and tilt(2) | | |
| X | 0.00 | Y | 0.00 | Z | 38.86 |
| α | -26.08 | β | 0.00 | γ | 0.00 |
| | | | Displacement and tilt(3) | | |
| X | 0.00 | Y | 20.51 | Z | 42.92 |
| α | 0.00 | β | 0.00 | γ | 0.00 |
| | | | Displacement and tilt(4) | | |
| X | 0.00 | Y | 37.55 | Z | 30.79 |
| α | -32.55 | β | 0.00 | γ | 0.00 |
| | | | Displacement and tilt(5) | | |
| X | 0.00 | Y | 35.51 | Z | 41.74 |
| α | 9.75 | β | 0.00 | γ | 0.00 |
| | | | Displacement and tilt(6) | | |
| X | 0.00 | Y | 28.61 | Z | 29.82 |
| α | 27.20 | β | 0.00 | γ | 0.00 |
| | | | Displacement and tilt(7) | | |
| X | 0.00 | Y | 27.04 | Z | 27.27 |
| α | 31.56 | β | 0.00 | γ | 0.00 |
| | | | Displacement and tilt(8) | | |
| X | 0.00 | Y | 38.66 | Z | 45.12 |
| α | 39.62 | β | 0.00 | γ | 0.00 |

When, as described in the foregoing examples, the light from the light source 5 incident on the decentered prism (prism member) 10 through the second surface 12 or the third surface 13 leaves the prism through the first surface 11 to illuminate the reflection-type LCD 3, the area where the illumination light passes through the second surface 12 or the third surface 13 and the area where the light from the reflection-type LCD 3 is reflected at the second surface 12 or the third surface 13 may be constructed as separate areas juxtaposed in the second surface 12 or the third surface 13. In this case, only the reflecting area of that surface may be mirror-coated.

Figure 19A:
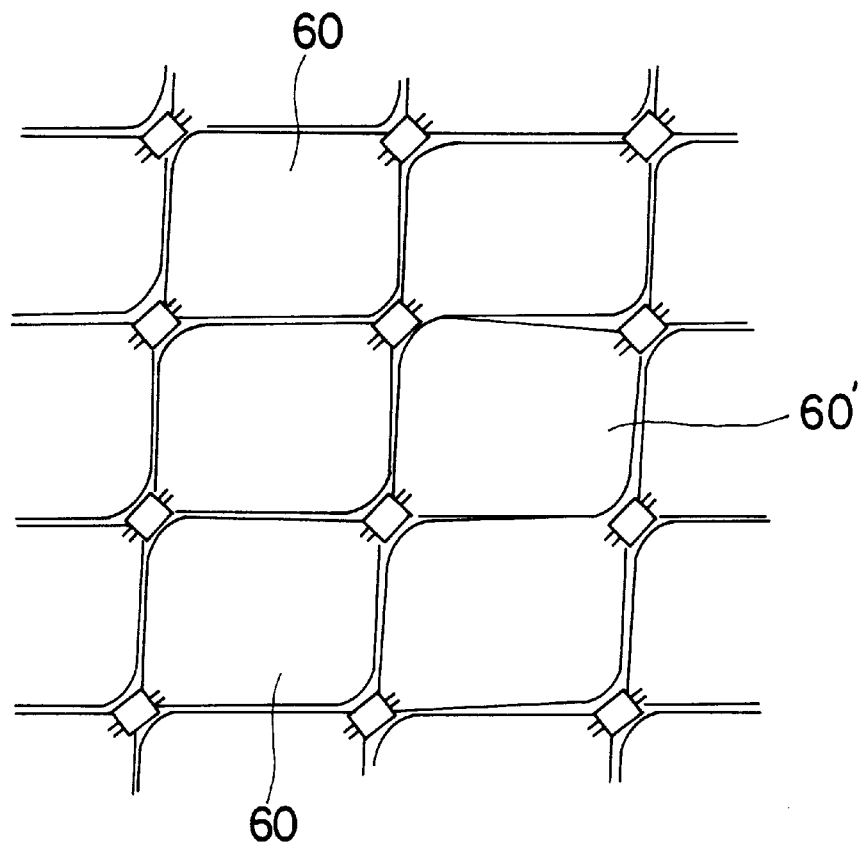
FIG. 19 is a schematic illustrative of one construction of a known DMD.
Figure 19B:
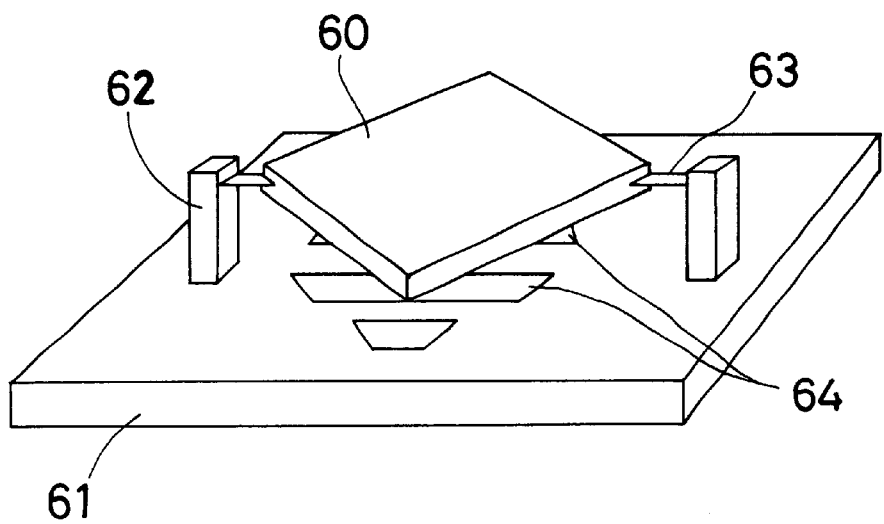

While the foregoing examples are explained on the assumption that the reflection-type LCD 3 is used as the reflection type image display device, it is understood that the DMD (digital micro-device) shown in FIG. 19 may be used in place thereof.

Throughout the foregoing examples, the reflection-type LCD 3 is used with the decentered prism constructed in a non-telecentric form with the entrance pupil located at a finite distance. In the present invention, however, an image display device having no two-dimensional image screen may be used, as will be described just below.

Figure 7:
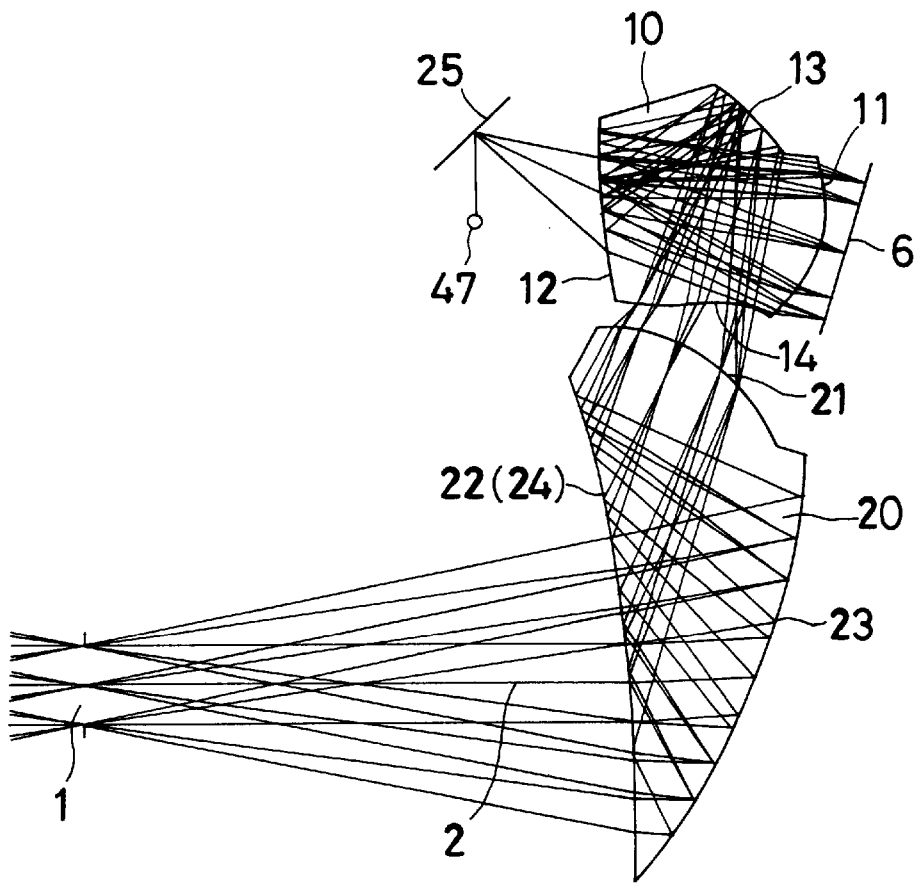
FIG. 7 is a diagram illustrative of another embodiment of the image display apparatus according to the invention, wherein the image display element is constructed, using a scan member.
Figure 8:
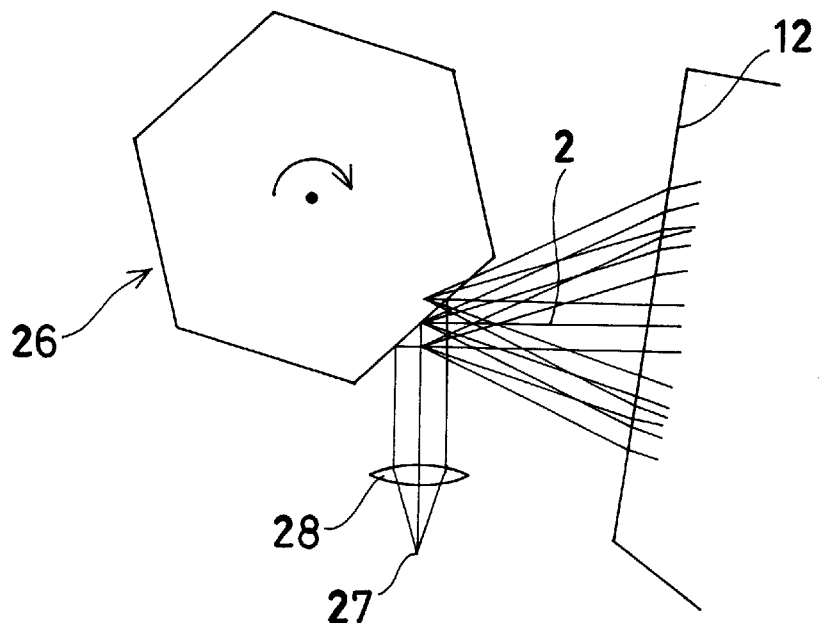
FIG. 8 is a schematic illustrative of one embodiment of the scan member of FIG. 7 operating in a one-dimensional scanning mode.

For instance, the reflection-type LCD 3 in the image display device shown in FIG. 4 may be replaced by a simple plane mirror or scattering surface 6, and the light source 5 may be substituted by an image display device 47 for forming a two-dimensional image by scanning and a scan member 25, as shown in FIG. 7.

If one-dimensional scanning is mainly carried out in this case, then a polygon mirror may be used for the scan member 25 along with a one-dimensional image display device (a one-dimensional array of display pixels such as those in a liquid crystal display device or LED) and a collimator lens 28 for converting light into parallel light beams, which may be used for the image display device 47. In this arrangement, the entrance pupil of the prism member 10 is positioned in substantial alignment with a reflecting surface formed on the surfaces of revolution of the polygon mirror 26. Then, the light beam is scanned in the direction perpendicular with respect to the array of pixels in the one-dimensional image display device 27, whereby a two-dimensional image is formed.

Figure 9:
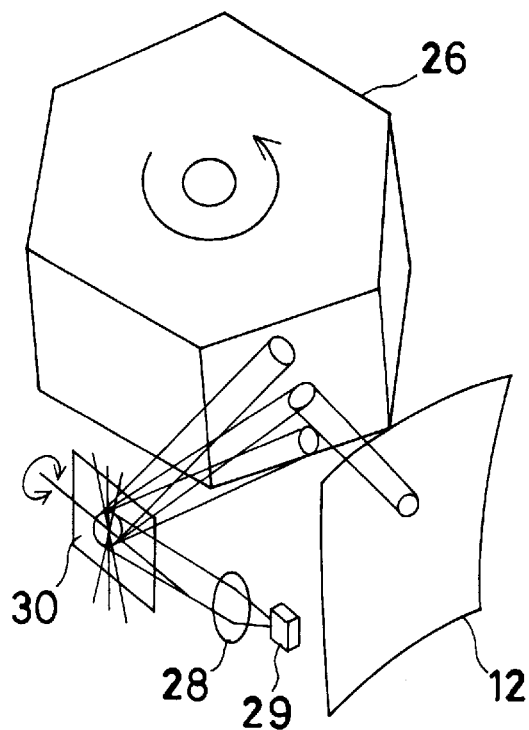
FIG. 9 is a schematic illustrative of another embodiment of the scan member of FIG. 7 operating in a two-dimensional scanning mode.

If two-dimensional scanning is primarily carried out, then a pixel light source 29 for providing a display corresponding to one pixel may be used for the one-dimensional image display device 27, as typically shown in FIG. 9. In addition, there is positioned a galvanomirror 30 having a scanning function in the direction perpendicular with respect to the scanning direction of the polygon mirror 26. It is here noted that this galvanomirror may be constructed of a polygon mirror or the like provided that it has a scanning function.

In the foregoing examples, it is desired that a numerical aperture-controlling element be located in an optical path defined by optical elements such as light source 5, reflection-type LCD 3, polygon mirror 26 and plane mirror 6 for the purpose of preventing ghost images which may otherwise be formed by a light beam of light emitted from such optical elements, which is guided to the observer's eyeball by way of the prism member 10, said light beam being other than an effective light beam for forming the entrance pupil and having a large numerical aperture. More effectively, it is preferable to locate this numerical aperture-controlling element in an optical path between each optical element and the prism member 10. For the numerical aperture-controlling element, for instance, a louver optical element 42a or an optical fiber plate 42b may be used, as explained just below.

Figure 10A:
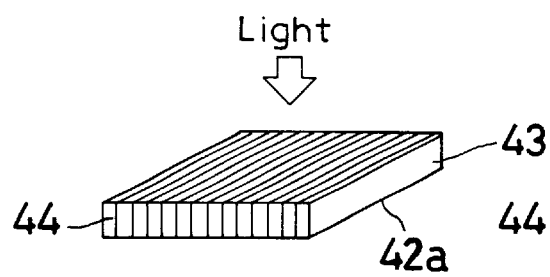
FIGS. 10(a) and 10(b) are views illustrative of louver optical elements.
Figure 10B:
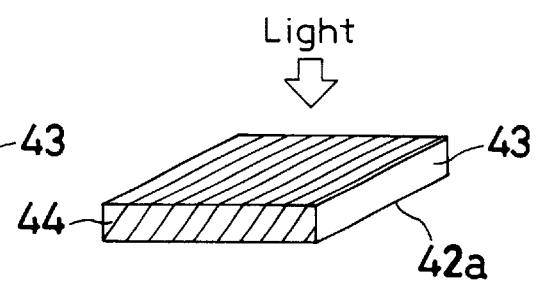
Figure 11A:
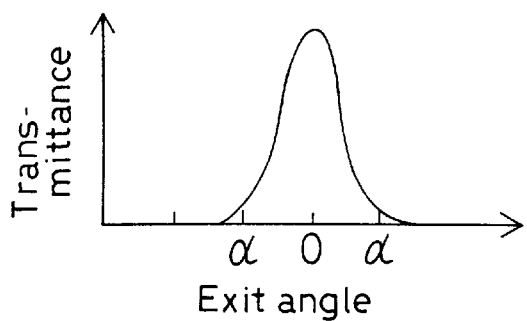
FIGS. 11(a) and 11(b) are graphs showing index profiles for the louver optical elements of FIGS. 10(a) and 10(b), respectively.
Figure 11B:
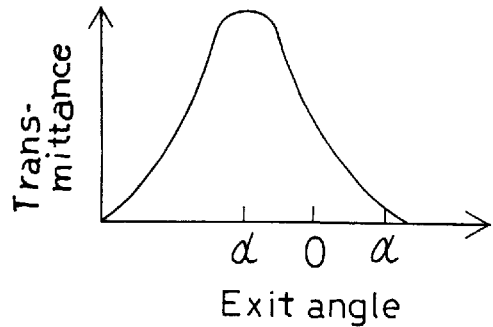

Examples of the louver optical element 42a are shown in FIGS. 10(a) and 10(b). The louver optical element 42a comprises a transparent film 43 with periodically built-in thin walls 44 which absorb and confine all light deviating from a certain angle of incidence. By varying the angle of the thin walls 44, it is possible to vary the angle of incidence for the maximum transmission. Transmittance profiles for the louver optical element 42a upon incidence of a light beam from the directions shown by arrows in FIGS. 10(a) and 10(b) are shown in FIGS. 11(a) and 11(b), respectively.

When such a louver optical element 42a is inserted between the light source 5 and the third surface 13 shown in FIG. 1, the numerical aperture of light from the light source 5 is controlled by the louver optical element 42a. Then, this light is reflected at the reflection-type LCD 3, propagating toward the prism member 10. Thus, this louver optical element 42a, which is designed to prevent transmission of a light beam having an angle of incidence larger than the critical angle of incidence a as shown in FIG. 11(a), can prevent ghost images which may otherwise occur in the case of a light beam having an angle of incidence larger than the critical angle of incidence α.

As in the foregoing examples, the prism member 10 comprises optical action surfaces which do not exist co-axially and are formed into rotationally asymmetric surface shapes. For this reason, a light beam having a numerical aperture large enough to give rise to ghost images is often in asymmetry with respect to the angle of incidence of zero, as shown in FIG. 11(a). In such a case, it is desired that another louver optical element 42a comprising a transparent film 43 in which thin light-blocking walls 44 are built at certain angles, as shown in FIG. 11(b), be used to control the transmittance of incident light with respect to a light beam having a given angle of incidence.

Figure 12:
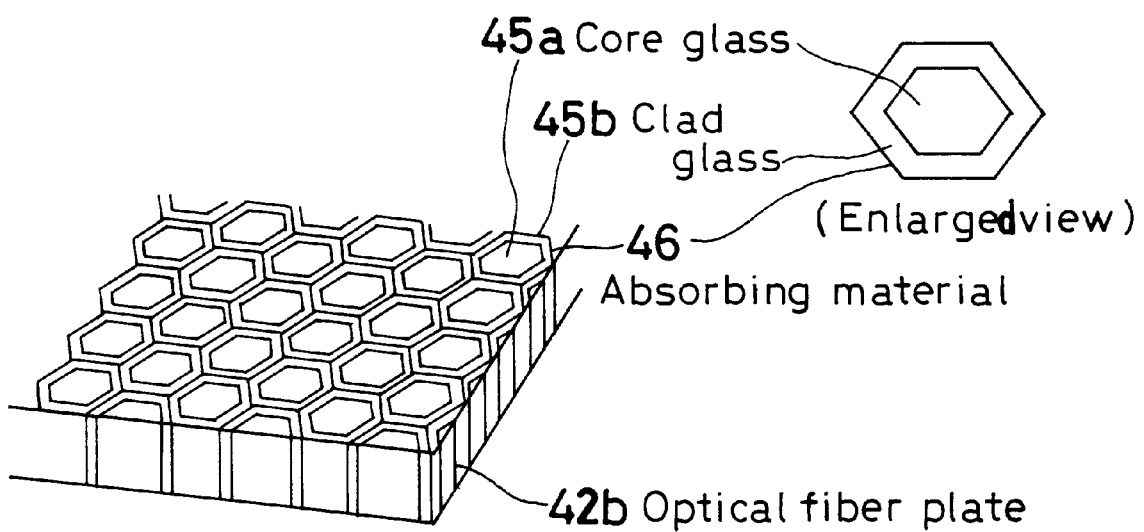
FIG. 12 is a partly cut-away view illustrative of an optical fiber plate.

Instead of this louver optical element 42a, it is acceptable to use an optical fiber plate 42b which are obtained by cutting a bundle of optical fibers in the form of a plate. One example of the structure of this optical fiber plate 42b is shown in FIG. 12. As can be seen from an enlarged view given in FIG. 12, each optical fiber comprises a core glass 45a, a clad glass 45b provided therearound, and an absorbing material 46 coated on the outer periphery of clad glass 45b. A number of such optical fibers, each having a given numerical aperture, are closely bundled together into an optical fiber plate. This optical fiber plate has the same action as in the aforesaid louver optical element 42a, because a light beam having a numerical aperture larger than that determined by the optical fibers passes through the optical fiber walls for absorption by the absorbing material 46.

A set of such image display apparatus as explained so far may be used for observation with one eye, and a pair of such sets may be used for observation with both eyes while they are spaced away from each other by an interpupillary distance. Thus, it is possible to achieve a stationary or portable image display system for observation with one eye or both eyes.

Figure 13:
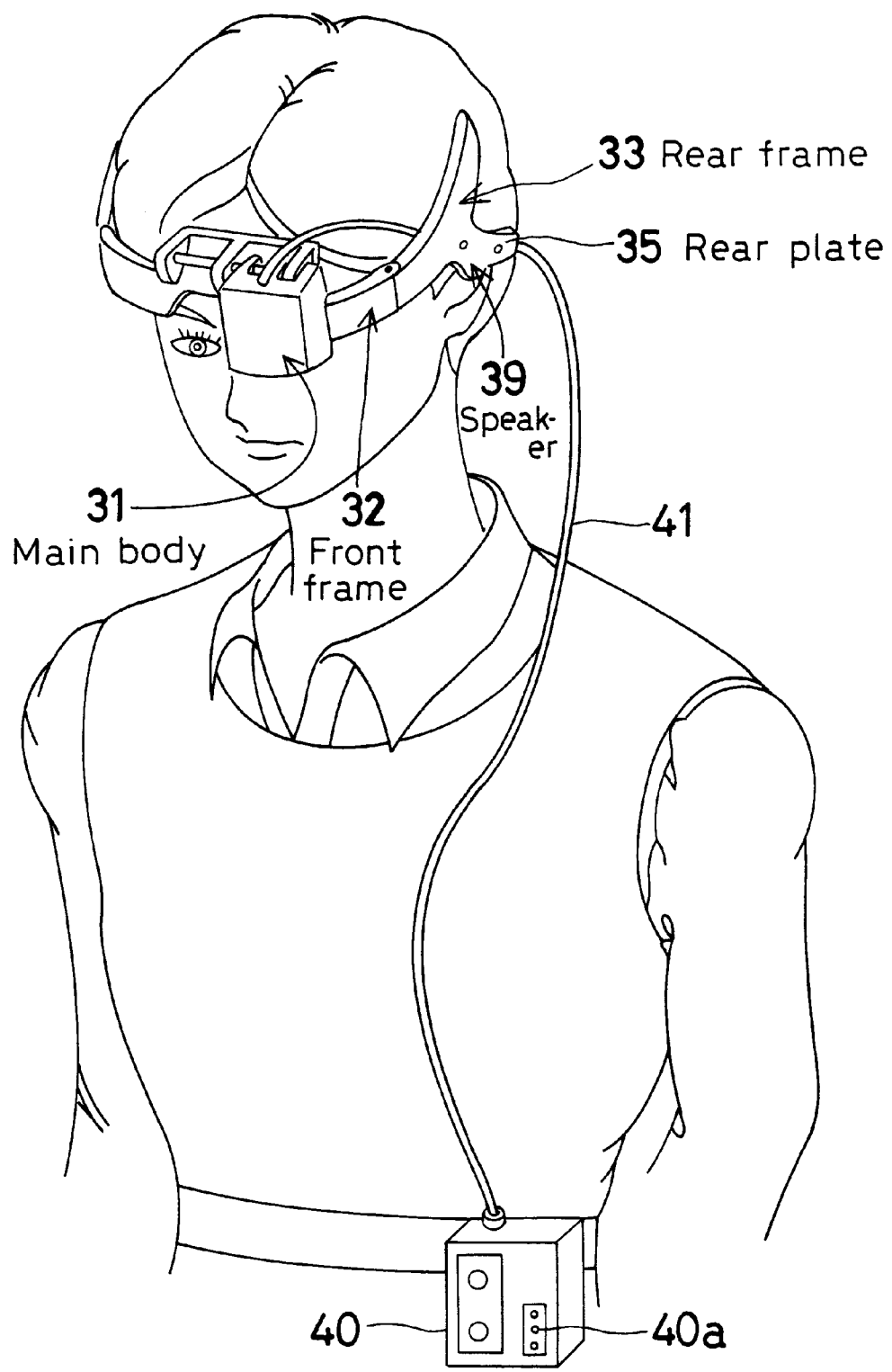
FIG. 13 is a schematic illustrative of how the image display apparatus according to the invention is mounted on one eye of an observer.
Figure 14:
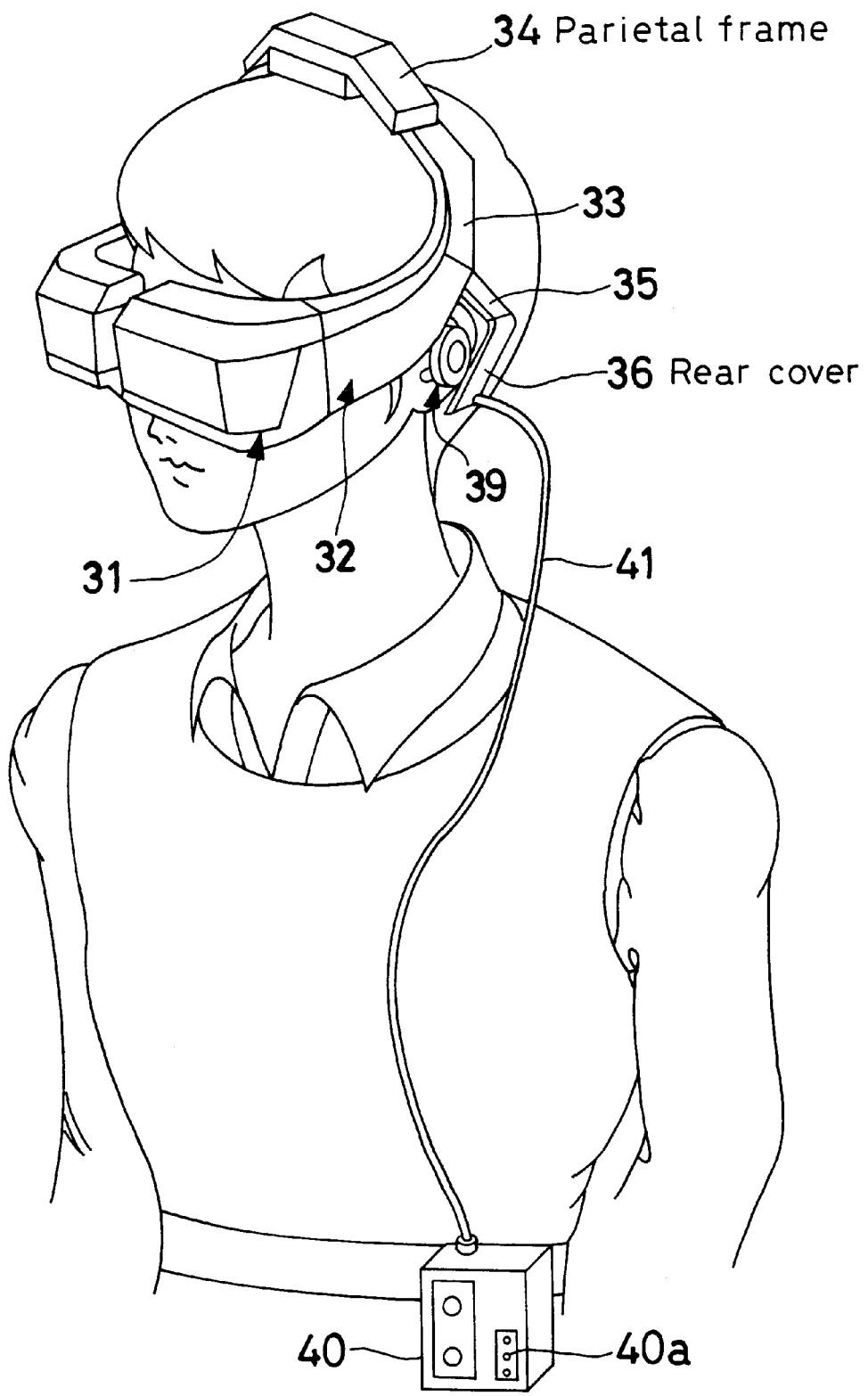
FIG. 14 is a schematic illustrative of how the image display apparatus according to the invention is mounted on both eyes of an observer.
Figure 15:
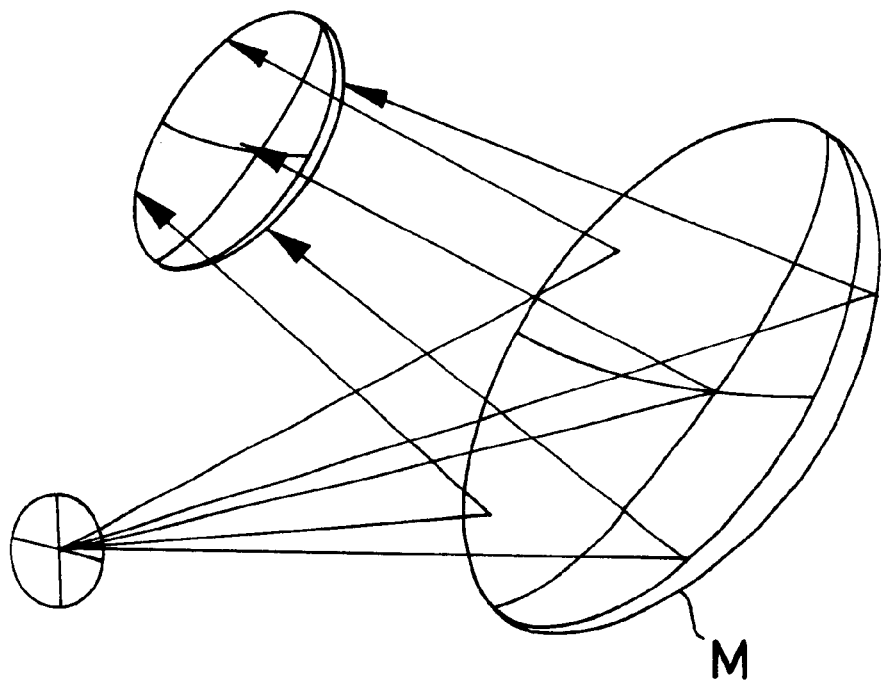
FIG. 15 is a diagram illustrative of field curvature produced by a decentered concave mirror.
Figure 16:
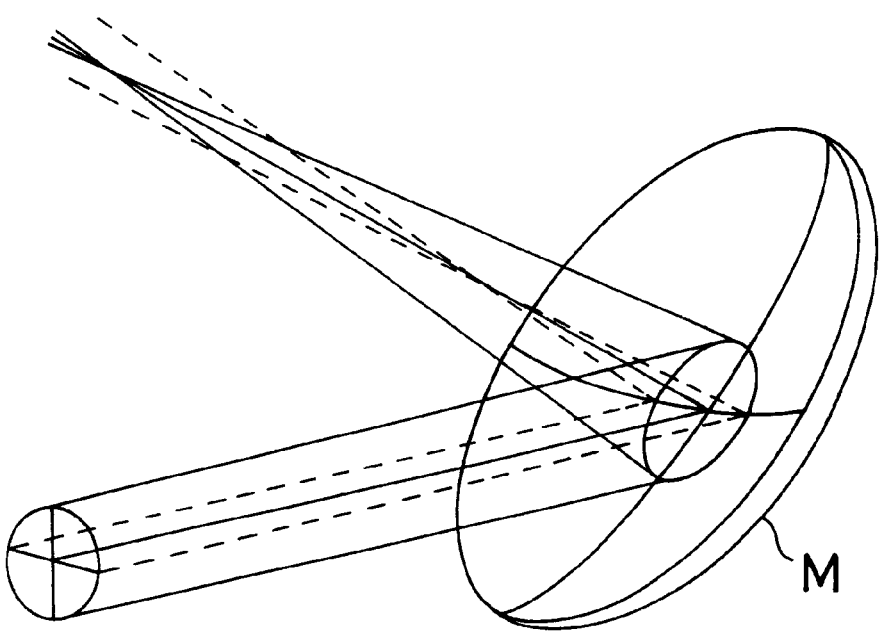
FIG. 16 is a schematic illustrative of astigmatism produced by a decentered concave mirror.
Figure 17:
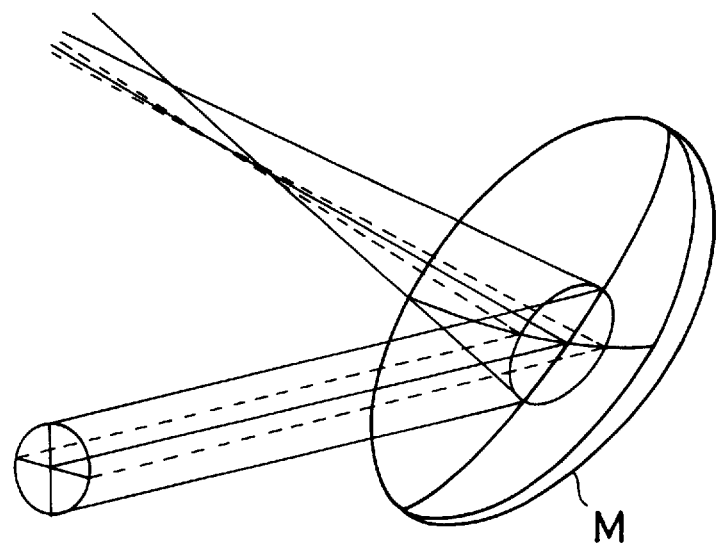
FIG. 17 is a schematic illustrative of coma produced by a decentered concave mirror.
Figure 18:
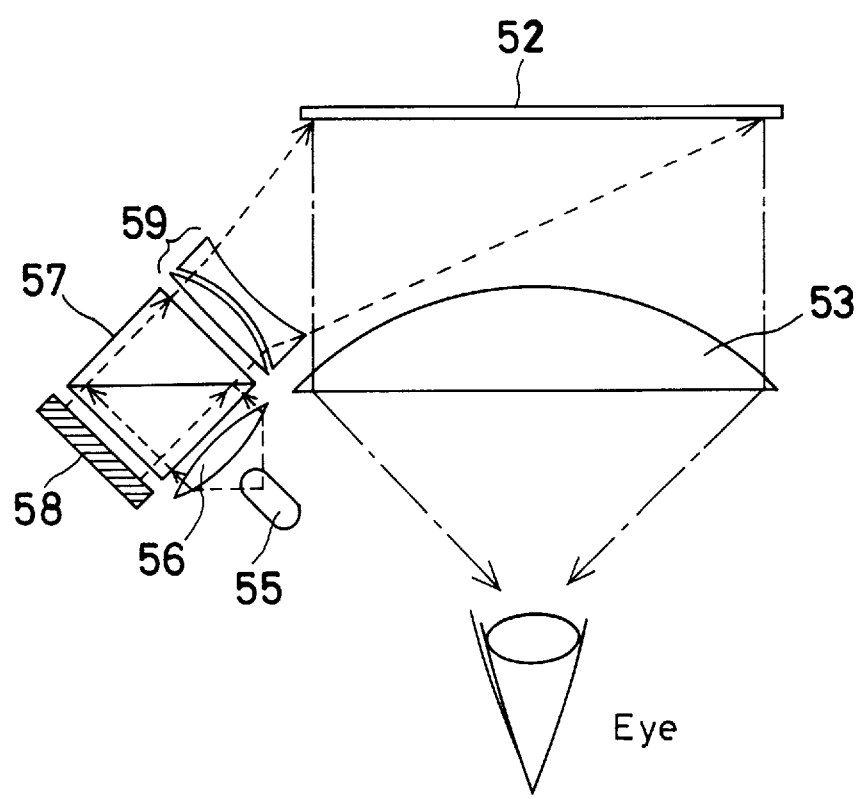
FIG. 18 is a schematic illustrative of an optical system in a prior art image display apparatus using a reflection-type LCD.

How the image display apparatus is used for observation with one eye (the left eye in this case) is shown in FIG. 13, and how the image display apparatus are used for observation with both eyes is shown in FIG. 14. In FIGS. 13 and 14, reference numeral 31 represents a main body of the image display apparatus, which is fixedly positioned in front of the left eye of an observer in the case of FIG. 13, and in front of both eyes of the observer in the case of FIG. 14, by means of a supporting member over the head. The supporting member comprises front frames 32 which are joined at one ends to the main body 31 and extend from the temples to sites above the ears and rear frames 33 which are joined to the other ends of the front frames 32 and extends along the temporal sites of the observer, as shown in FIG. 13. Alternatively, the supporting member comprises rear frames 33 and a parietal frame 34 joined at both ends to the other ends of rear frames 33 and fitted over the parietal site of the observer, as shown in FIG. 14.

Rear plates 35 formed of a resilient material, for instance, in the form of metal leaf springs, are joined to the vicinities of junctions of the front frames 32 to the rear frames 33. The rear plates 35 are designed such that rear covers 36 forming a part of the supporting member are positioned over a site extending from the back of the head to the root of the neck and behind the ears (FIG. 14). Speakers 39 are attached to sites within the rear plates 35 or the rear covers 36, which sites correspond to the ears of the observer.

A cable 41 for transmitting image and sound signals from the outside extends from the main body 31 of the image display apparatus through the parietal frame 34 (the FIG. 14 embodiment), rear frames 33, front frames 32 and rear plates 34 to the rear plates 35 or rear covers 36 from the rear ends of which it extends. This cable 41 is connected to a video deck 40. In FIGS. 13 and 14, 40a represents a control portion for the video deck 43, on which volume and other control switches are mounted.

It is noted that the cable 41 may have a jack end attachable to an existing video deck. In addition, the cable 41 may be connected to a TV wave receiving tuner so that the user can watch television, or the cable 41 may be connected to a computer to receive computer graphic images or message images therefrom. To eliminate bothersome cords, the image display apparatus may be designed to receive external signals through an antenna connected thereto.

According to the invention as can be seen from the foregoing explanation, the ocular optical system comprises one or two prism members, in which two internal reflections occur on the side opposing to the image display device and an optical path crosses over itself, and the image display device comprises a reflection type image display device for displaying images by means of reflected light of illumination light, so that the reflection type image display device is illuminated with illumination light by way of a specific reflecting surface of the prism member. It is thus possible to use a reflection-type LCD, etc. together with a prism member comprising a decentered prism, thereby achieving slimmed-down yet high-performance image display device which can present bright images to an observer.

What we claim is:

1. An image display apparatus comprising an illumination light source, an image display device and an ocular optical system for guiding an image formed by said image display device to a position of an observer's eyeball, wherein:

said ocular optical system is designed to form an intermediate image for said image formed by said image display device, so that said intermediate image can be projected onto the observer's eyeball, said ocular optical system comprises at least one prism member filled therein with a medium having a refractive index of at least 1, said prism member comprising a first surface through which image-carrying light leaving said image display device enters a prism, a second surface at which a light beam incident from said first surface is reflected and a third surface at which a light beam reflected from said second surface is reflected, while an optical path for connecting said first surface with said second surface intersects a reflection optical path from said third surface, said ocular optical system further comprises at least one back-coated reflecting surface located on an optical path between said third surface and an observer's eyeball side for reflecting a light beam upon reflection at said third surface, at least said first surface, said second surface and said third surface of said prism member being positioned between said image and said intermediate image, at least one of said second surface and said third surface, and said at least one back-coated reflecting surface have each a curved surface shape capable of imparting power to a light beam, said curved surface shape being defined by a rotationally asymmetric surface shape capable of making correction for aberrations produced by decentration, said image display device is built up of a reflection type image display device for displaying an image thereon by means of reflected light, and said illumination light source is designed to cause illumination light beam to be incident on said reflection type image display device from said second surface or said third surface or a surface near thereto, thereby illuminating said image display device.

2. The image display apparatus according to claim 1, wherein said second surface is formed of a half-coated mirror surface or a total reflecting surface, thereby providing a combined surface having a reflecting action on an image-carrying light beam from said image display device and an action on incidence of an illumination light beam from said illumination light source.

3. The image display apparatus according to claim 1, wherein an illumination light beam incident from said illumination light source through said second surface passes through said first surface to illuminate said reflection type image display device.

4. The image display apparatus according to claim 1, wherein said third surface is formed of a half-coated mirror surface or a total reflecting surface, thereby providing a combined surface having a reflecting action on an image-carrying light beam from said image display device and an action on incidence of an illumination light beam from said illumination light source.

5. The image display apparatus according to claim 1, wherein an illumination light beam incident from said illumination light source through said third surface passes through said first surface upon reflection at said second surface to illuminate said reflection type image display device.

6. The image display apparatus according to claim 1, wherein said second surface and said third surface are each formed into a rotationally asymmetric surface shape capable of imparting power to a light beam and making correction for decentration aberrations.

7. The image display apparatus according to claim 1, wherein said first surface is formed into a rotationally asymmetric surface shape capable of imparting power to a light beam and making correction for decentration aberrations.

8. The image display apparatus according to claim 1, wherein said at least one back-coated reflecting surface is constructed of one prism member together with said first surface, said second surface and said third surface.

9. The image display apparatus according to claim 8, wherein said one prism member comprises, in addition to said back-coated reflecting surface, at least one reflecting surface and at least one exit surface on an optical path between said intermediate image and said observer's eyeball, while at least one of said at least one reflecting surface and said at least one exit surface is formed into a rotationally asymmetric surface shape capable of imparting power to a light beam and making correction for decentration aberrations.

10. The image display apparatus according to claim 9, wherein said reflecting surface and said exit surface are constructed of the same surface while said reflecting surface is constructed of a total reflecting surface.

11. The image display apparatus according to claim 1, wherein said at least one back-coated reflecting surface is constructed of a second prism member apart from a first prism member that is said prism member comprising said first surface, said second surface and said third surface.

12. The image display apparatus according to claim 11, wherein said second prism member comprises at least an entrance surface, said back-coated reflecting surface, a reflecting surface and an exit surface, while at least one of said at least one said at least one reflecting surface and said exit surface is formed into a rotationally asymmetric surface shape capable of imparting power to a light beam and making correction for decentration aberrations.

13. The image display apparatus according to claim 12, wherein said reflecting surface and said exit surface are constructed of the same surface while said reflecting surface is constructed of a total reflecting surface.

14. The image display apparatus according to claim 11, wherein an exit surface of said first prism member is opposed to said entrance surface of said second prism member.

15. The image display apparatus according to any one of claims 1 to 14, wherein said rotationally asymmetric surface shape is defined by a free-form surface shape having only one symmetric plane.

16. The image display apparatus according to claim 15, wherein said only one symmetric plane is designed to be formed in agreement with a second in which an axial chief ray is turned back.

17. The image display apparatus according to any one of claims 1 to 14, wherein said illumination light source, said reflection type image display device and said ocular optical system are designed such that an angle of incidence of illumination light beam from said illumination light source onto said reflection type image display device is substantially equal, with an allowance of ±10%, to an exit angle of a reflected chief ray from said illumination light source.

18. The image display apparatus according to any one of claims 1 to 14, wherein a numerical aperture-reducing member is located between said illumination light source and said prism member to prevent occurrence of a ghost image.

19. The image display apparatus according to any one of claims 1 to 14, which satisfies the following condition:

$$\theta < 50° \tag{1}$$

wherein $\theta$ is an angle of an axial chief ray leaving a center of a display surface of said reflection type image display device with respect to a normal to a display device surface.

20. The image display apparatus according to any one of claims 1 to 14, which comprises an illumination light source for a right eye and an illumination light source for a left eye, an image display device for a right eye and an image display device for a left eye, and an ocular optical system for a right eye and an ocular optical system for a left eye.

21. The image display apparatus according to any one of claims 1 to 14, which comprises a supporting means for supporting said image display apparatus on an observer's head, thereby positioning said image display apparatus in front of an observer's face.

* * * * *